United States Patent
Meier et al.

(10) Patent No.: US 10,616,254 B2
(45) Date of Patent: Apr. 7, 2020

(54) DATA STREAM SURVEILLANCE, INTELLIGENCE AND REPORTING

(71) Applicant: SECUDE AG, Lucerne (CH)

(72) Inventors: Philipp Meier, Lucerne (CH); Rainer Lindemann, Lucerne (CH)

(73) Assignee: Secude AG, Lucerne (CH)

( * ) Notice: Subject to any disclaimer, the term of this patent is extended or adjusted under 35 U.S.C. 154(b) by 192 days.

(21) Appl. No.: 15/830,913

(22) Filed: Dec. 4, 2017

(65) Prior Publication Data

US 2018/0159884 A1 Jun. 7, 2018

Related U.S. Application Data

(60) Provisional application No. 62/429,400, filed on Dec. 2, 2016, provisional application No. 62/458,197, filed on Feb. 13, 2017.

(51) Int. Cl.
*H04L 12/28* (2006.01)
*H04L 29/06* (2006.01)
(Continued)

(52) U.S. Cl.
CPC ...... *H04L 63/1425* (2013.01); *G06F 11/3476* (2013.01); *G06F 16/24556* (2019.01);
(Continued)

(58) Field of Classification Search
None
See application file for complete search history.

(56) References Cited

U.S. PATENT DOCUMENTS

| | | | | | |
|---|---|---|---|---|---|
| 7,639,621 | B1* | 12/2009 | Larosa | .................... | H04L 12/66 370/241 |
| 8,248,227 | B2* | 8/2012 | Sheleheda | ............ | G08B 25/001 340/506 |

(Continued)

OTHER PUBLICATIONS

International Search Report and Written Opinion dated Mar. 7, 2018 issued in corresponding PCT International Application No. PCT/IB2017/001609.

*Primary Examiner* — Elisabeth Benoit Magloire
(74) *Attorney, Agent, or Firm* — Amster, Rothstein & Ebenstein LLP

(57) ABSTRACT

A method for monitoring and securing interprogram communications between a plurality of business applications in a network includes gathering, using a computing device, information regarding communications between the plurality of business applications, the gathering step including steps of reading information from a log file in which information regarding each communication into and out of the business application is recorded, reading information from internal files of the business application and recording information obtained from data messages entering and leaving the business application, simplifying the gathered information, the simplifying step including normalizing the information into a common format based on a shared parameter value; and merging the normalized information together, classifying the information based on desired parameters, the classifying step including steps of designating a classification of the information based on content of the communication and designating certain information as sensitive; and analyzing the classified information to provide a report on the information to be presented to a user via a user interface based on a user provided query, the analyzing step further including a step of generating the report based at least in part (Continued)

on the classification of the information designated in the classifying step.

22 Claims, 19 Drawing Sheets

(51) Int. Cl.
  *G06F 16/28* (2019.01)
  *G06F 16/2455* (2019.01)
  *H04L 12/26* (2006.01)
  *G06Q 10/10* (2012.01)
  *G06F 11/34* (2006.01)
  *H04L 12/24* (2006.01)

(52) U.S. Cl.
  CPC ........... *G06F 16/285* (2019.01); *G06Q 10/10* (2013.01); *H04L 41/22* (2013.01); *H04L 43/04* (2013.01); *H04L 43/045* (2013.01); *H04L 43/06* (2013.01); *H04L 43/062* (2013.01); *H04L 63/1441* (2013.01)

(56) References Cited

U.S. PATENT DOCUMENTS

| | | |
|---|---|---|
| 9,390,240 B1 | 7/2016 | Brisebois et al. |
| 2015/0163121 A1* | 6/2015 | Mahaffey ............ G06F 11/0766 |
| | | 707/687 |
| 2017/0339172 A1* | 11/2017 | Mahadevia ............ G06F 21/554 |
| 2018/0167402 A1* | 6/2018 | Scheidler ............... G06F 21/552 |
| 2018/0176244 A1* | 6/2018 | Gervais ................. G06F 21/552 |
| 2019/0222594 A1* | 7/2019 | Davis, III ........... H04L 63/1425 |

\* cited by examiner

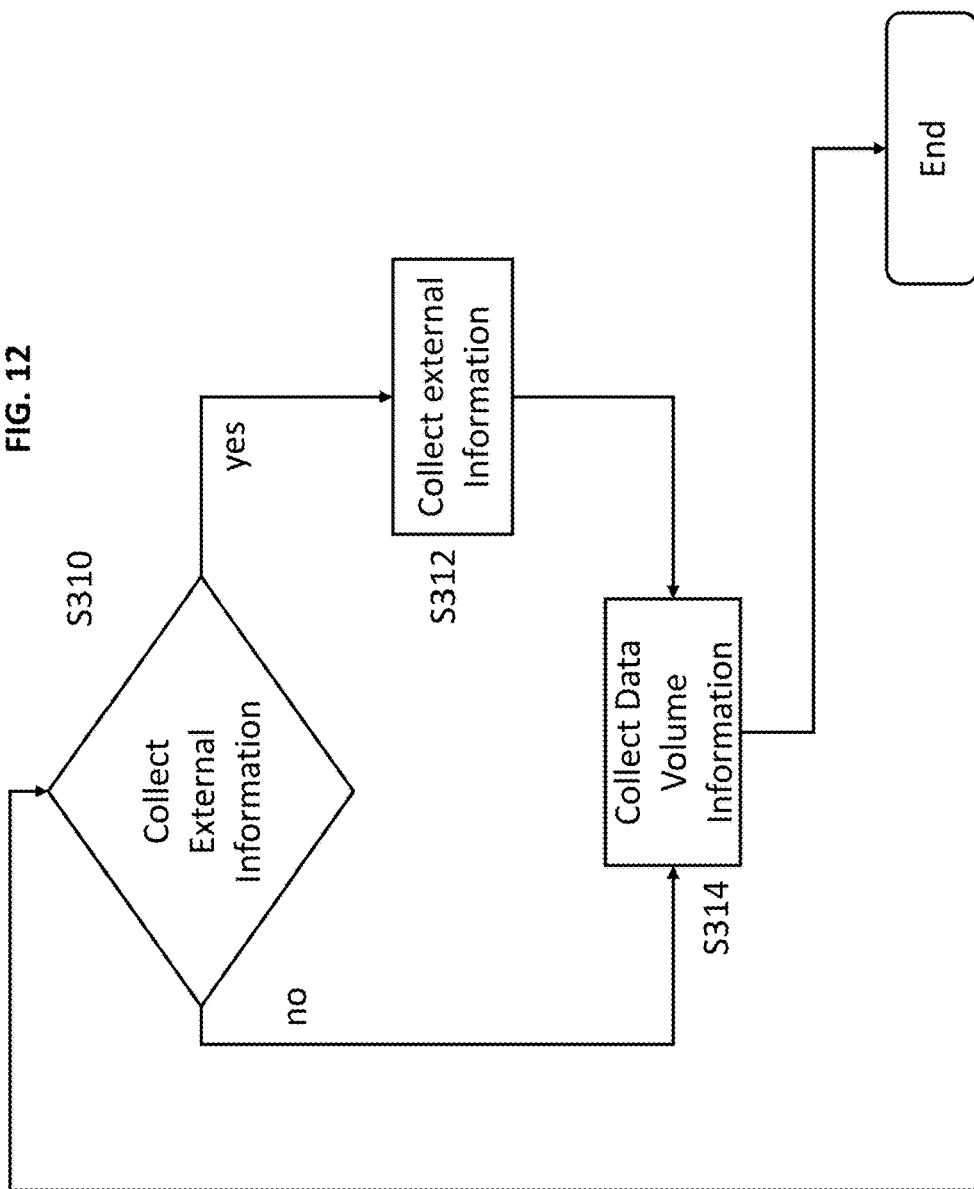
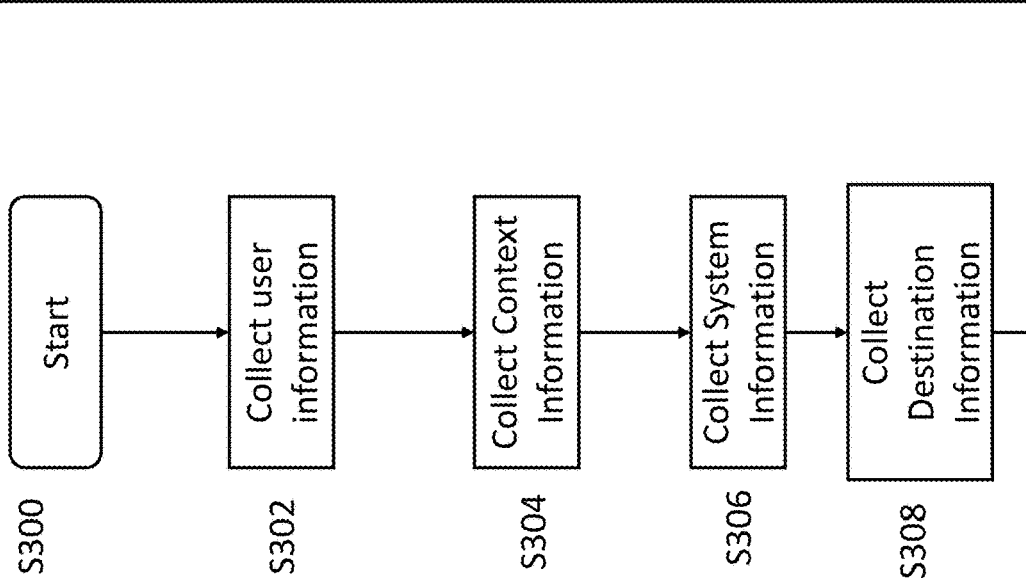
FIG. 12

DATA STREAM SURVEILLANCE, INTELLIGENCE AND REPORTING

RELATED APPLICATIONS

The present application claims benefit of and priority to U.S. Provisional Patent Application Ser. No. 62/249,400 filed Dec. 2, 2017 entitled DATA STREAM INTELLIGENCE AND REPORTING and U.S. Provisional Patent Application Ser. No. 62/458,197 filed Feb. 13, 2017 entitled DATA STREAM INTELLIGENCE AND REPORTING, the entire content of each of which is incorporated by reference herein.

BACKGROUND

Field of the Disclosure

The present invention relates to the field of data surveillance and data review and analysis and, in particular, to data communication between enterprise applications and enterprise applications and their clients. In embodiments, it is directed to specific applications of data surveillance and monitoring to provide security for interprogram communications between a plurality of business applications and clients in a network.

Related Art

In today's complex networks, with thousands of client machines, hundreds of servers and business applications and an ever growing number of internet services, data transfers and interaction between applications, devices and systems keeps growing. In such complex networks, controlling and securing data flow of valuable and critical business information is a difficult problem. Server applications may have a wide variety of clients including other server applications, client applications, direct human access and combinations of the above. Each of these can connect through a wide variety of interface technologies such that communication takes place using various protocols and mediums and the data is communicated in a variety of formats. This disparity in data makes it difficult or impossible to track and secure key information that is routinely shared between business applications and their clients in an enterprise environment. Existing data tracking systems focus on balancing system loads, preventing malware and security exploits and generally maintaining system health and system connections as well as services and infrastructure such that the specific contend of the data transmitted is unimportant. These monitoring systems, however, cannot accurately and efficiently track and secure key business information such as personal information, financial information or other sensitive information since they do not consider the content or classification of any particular data message sent. There is currently no way to accurately track and secure communication of key business information in a business enterprise setting between application programs and between business application and their clients.

SUMMARY

It is an object of the present disclosure to provide a method and system to provide surveillance to monitor and secure information communicated between a plurality of business applications and/or between business application and other clients or elements of a business enterprise network.

A method for monitoring and securing data communications between a plurality of business applications in a network in accordance with an exemplary embodiment of the present application includes the steps of gathering, using a computing device, information regarding communications between the plurality of business applications, the gathering step further including steps of reading information from a log file in which information regarding each communication into and out of the business application is recorded, reading information from internal files of the business application and recording information obtained from data messages entering and leaving the business application; enhancing the gathered information based on an environment of the information to add information, the enhancing step further including steps of adding information to the gathered information based on an IP address included in the gathered information and adding information to the gathered information based on external information; aggregating the enhanced data to minimize a size of the information, the aggregating step further including steps of comparing information regarding communication at a first time with information regarding a communication at a second time and aggregating the information regarding communication at the first time with the information regarding the communication at the second time when information is redundant and the second time is within a predetermined time interval of the first time; simplifying the gathered information, the simplifying step further including normalizing the information into a common format based on a shared parameter value and merging the normalized information together; classifying the information based on desired parameters, the classifying step further including steps of designating a classification of the information based on content of the communication; and designating certain information as sensitive and analyzing the classified information to provide a report on the information to be presented to a user via a user interface based on a user provided query, the analyzing step further including a step of generating the report based at least in part on the classification of the information designated in the classifying step.

A method for monitoring and securing data communications between a plurality of business applications in a network in accordance with another exemplary embodiment of the present application includes the steps of gathering, using a computing device, information regarding communications between the plurality of business applications, the gathering step further including steps of reading information from a log file in which information regarding each communication into and out of a business application is recorded, reading information from internal files of the business application and recording information obtained from data messages entering and leaving the business application; simplifying the gathered information, the simplifying step further including normalizing the information into a common format based on a shared parameter value and merging the normalized information together; classifying the information based on desired parameters, the classifying step further including steps of designating a classification of the information based on content of the communication and designating certain information as sensitive and analyzing the classified information to provide a report on the information to be presented to a user via a user interface based on a user provided query, the analyzing step further including a step of generating the report based at least in part on the classification of the information designated in the classifying step.

A method for monitoring and securing data communications between a plurality of business applications in a network in accordance with another exemplary embodiment of the present application includes the steps of gathering, using a computing device, information regarding communication between the plurality of business applications, the gathering step further including steps of reading information from a log file in which information regarding each communication into and out of a business application is recorded, reading information from internal files of the business application and recording information obtained from data messages entering and leaving the business application; simplifying the gathered information, the simplifying step including normalizing the information into a common format based on a shared parameter value and merging the normalized information together; classifying the information based on desired parameters, the classifying step further including steps of designating a classification of the information based on content of the communication and designating certain information as sensitive; analyzing the classified information to provide a report on the information to be presented to a user via a user interface, the analyzing step further including a step of generating the report based at least in part on the classification of the information designated in the classifying step; and sending the report to another business application of the plurality of business applications in the network and combining it with the report of the another business application.

A system for monitoring and securing data communications between a plurality of business applications in a network in accordance with an exemplary embodiment of the present application includes at least one listener operable to gather information regarding communication between business applications in a network, the listener gathering the information by at least one of reading information from a log file in which information regarding each communication into and out of a business application is recorded, reading information out of other files related to the business application and recording information obtained from data messages entering and leaving the business application; an enriching element operable to enhance the gathered information based on an environment of the data to add information, the enriching element enhancing the information by at least one of adding information to the gathered information based on an IP address included in the gathered information and adding information to the gathered information based on external information; an aggregator operable to aggregate the information to minimize a size of the information, the aggregator element aggregating the information by comparing information regarding communication at a first time with information regarding a communication at a second time and aggregating the information regarding the communication at the first time with the information regarding the communication at the second time when information is redundant and the second time is within a predetermined time interval of the first time; a simplification element simplifying the gathered information, the simplification element normalizing the information into a common format based on a shared parameter value and merging the normalized information together; a classification element operable to classify the simplified information based on desired parameters, the classification element classifying the information by designating a classification of the information based on content of the communication and designating certain information as sensitive; and an analysis element operable to analyze the information to provide a report on the information to be presented to a user, where the analysis element generates the report based at least in part on the classification of the information designated in the classifying step; and a user interface operable to display the report to a user.

A system for monitoring and securing data communications between a plurality of business applications in a network in accordance with an exemplary embodiment of the present application includes at least one listener operable to gather information regarding communication between business applications in a network, the listener gathering the information by at least one of reading information from a log file in which information regarding each communication into and out of a business application is recorded, reading information out of other files related to the business application and recording information obtained from data messages entering and leaving the business application; a simplification element simplifying the gathered information, the simplification element normalizing the information into a common format based on a shared parameter value and merging the normalized information together; a classification element operable to classify the simplified information based on desired parameters, the classification element classifying the information by designating a classification of the information based on content of the communication and designating certain information as sensitive; an analysis element operable to analyze the information to provide a report on the information to be presented to a user, where the analysis element generates the report based at least in part on the classification of the information designated in the classifying step; and a user interface operable to display the report to a user.

A system for monitoring at least one listening element operable to gather information regarding communication between business applications in a network in accordance with an exemplary embodiment of the present disclosure includes at least one listener operable to gather information regarding communication between business applications in a network, the listening element gathering the information by at least one of reading information from a log file in which information regarding each communication into and out of a business application is recorded, reading information out of other files related to the business application and recording information obtained from data messages entering and leaving the business application; an enriching element operable to enhance the gathered information based on an environment of the data to add information, the enriching element enhancing the information by at least one of adding information to the gathered information based on an IP address included in the gathered information and adding information to the gathered information based on external information; an aggregator operable to aggregate the information to minimize a size of the information, the aggregating element aggregates by comparing information regarding communication at a first time with information regarding a communication at a second time and aggregating the information regarding communication at the first time with information regarding the communication at a second time when information is redundant and the second time is within a predetermined time interval of the first time; a simplification element simplifying the gathered information, the simplification element normalizing the information into a common format based on a shared parameter value and merging the normalized information together; a classification element operable to classify the information based on desired parameters, the classification element classifying the information by at least one of designating a classification of the information based on content of the communication and designating certain information as sensitive; an analysis element operable to analyze the classified information to provide a report on the information to be presented to a user, where the analysis element generates the report based at least in part on the classification of the information designated in the classifying step and a user interface associated with a second business application and operable to display at least one of one of the report, a second report related to the second business application and a combined report including the report and the second report to a user.

A system for monitoring and securing data communications between a plurality of business applications in a network in accordance with an exemplary embodiment of the present application includes at least one listening element operable to gather information regarding communication between business applications in a network, the listening element gathering the information by at least one of reading information from a log file in which information regarding each communication into and out of a business application is recorded, reading information out of other files related to the business application and recording information obtained from data messages entering and leaving the business application; a simplification element simplifying the gathered information, the simplification element normalizing the information into a common format based on a shared parameter value and merging the normalized information together; a classification element operable to classify the information based on desired parameters, the classification element classifying the information by at least one of designating a classification of the information based on content of the communication and designating certain information as sensitive; an analysis element operable to analyze the classified information to provide a report on the information to be presented to a user, where the analysis element generates the report based at least in part on the classification of the information designated in the classifying step; and a user interface associated with a second business application and operable to display at least one of one of the report, a second report related to the second business application and a combination report including the report and the second report to a user.

BRIEF DESCRIPTION OF THE DRAWINGS

The above and related objects, features and advantages of the present disclosure will be more fully understood by reference to the following, detailed description of the preferred, albeit illustrative, embodiment of the present invention when taken in conjunction with the accompanying figures, wherein:

FIG. 12 is a flow chart illustrating an exemplary method of gathering information regarding data communication in accordance with an exemplary embodiment of the present disclosure;

DETAILED DESCRIPTION OF THE EXEMPLARY EMBODIMENTS

Figure 1:
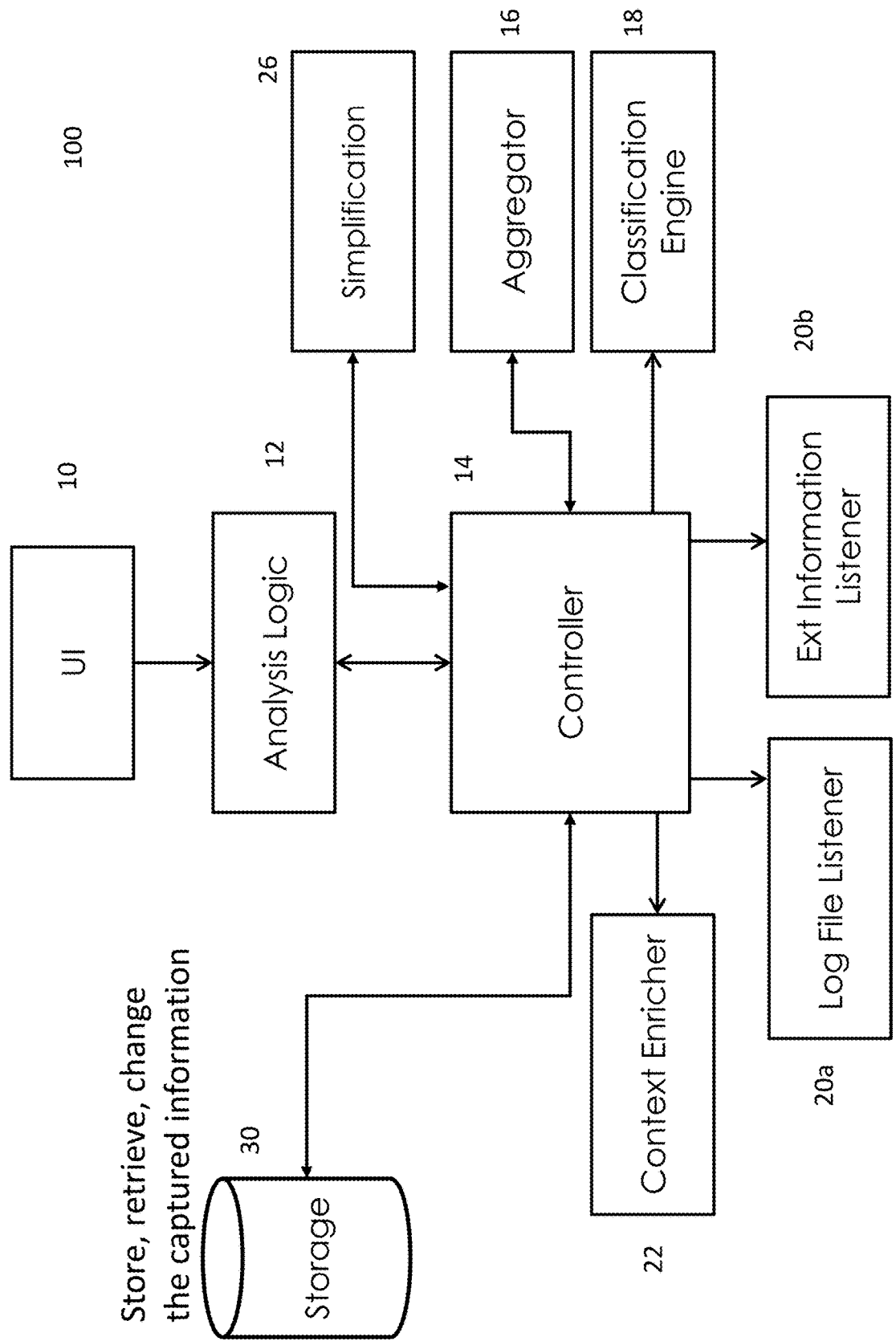
FIG. 1 illustrates an exemplary block diagram illustrating a system for monitoring and securing data communication between business applications in accordance with an exemplary embodiment of the present disclosure.

The method and system of the present disclosure relate generally to data surveillance and data review and analysis of data communications flowing between enterprise applications and enterprise applications and their clients. More specifically, the present disclosure relates to specific applications of data surveillance and monitoring to monitor and provide security for interprogram communication of proprietary data between business applications and their clients in an enterprise network environment.

The complexity of today's enterprise business landscapes which are often organically grown over many years, makes it virtually impossible for organizations to ensure security of data that is communicated between a variety of client machines and a variety of business applications over a variety of interfaces. This represents a substantial security and compliance problem that has not and cannot be addressed by existing monitoring systems and methods which focus on load balancing and system operations rather than securing proprietary business information. Thus, the problem to be solved is how to provide security for key business data communicated between a variety of business applications and clients in a network. Since these applications may all transmit and store data in different formats and using different techniques, a technological solution is necessary to provide for a way to classify the transmitted information in order identify the key business data and monitor and secure communication of this key business data.

Knowing where and how often specific data is being sent is not just a voluntary issue for any enterprise since regulation frameworks (like for example the GDPR in the EU) require companies to be compliant regarding the use of personally identifiable data within enterprise applications. Thus, security is not just a matter of good business, but in many cases, is a legal requirement.

Further, determining which applications work with the business data of other applications is important to ensure compliance with different licensing and cost models.

The system and method of the present disclosure will audit, classify, notify, block and protect enterprise software data downloaded via graphical user interfaces, based on information from the business application, for example, business applications provided by SAP SE. In an embodiment, monitoring and securing of data may be deployed on the server level or on endpoint devices. Server level interception allows data protection before it is transferred to a destination—whether it is cloud storage, a USB drive, a laptop, mobile phone or other device.

The method and system of the present disclosure addresses uncontrolled communication of data streams through machine-to-machine communication in an enterprise environment. Conventional monitoring is mainly oriented towards purely quantitative issues such as load balancing and performance. This monitoring does not take into account the content of the information that is being transmitted between the applicants, clients and other services in the enterprise environment and whether the communication of certain data results in a security or compliance risk.

Data entering and leaving enterprise software applications, devices or systems over virtually all interface mechanisms (e.g. user downloads, front-end printing, RFC, IDocs) may be gathered, enhanced, simplified classified and analyzed for reporting. In the process of gathering data, the data stream intelligence system and method (DSI) of the present disclosure deploys an intelligent solution to provide common classification for the various data streams such that all data can be classified using common classifications. The "intelligent" result of this solution recognizes the business content of the exchanged data and other features that indicate a sensitivity of the information communicated. The collected report information may be presented as a multi-dimensional cube that allows visualization of the communication partner entities, the used transfer mechanisms, the frequency, volume and the classification categories.

The DSI system and method may also provide control over what data leaves the enterprise software systems. It allows understanding of which systems or applications talk to which other systems within and outside of networks and it allows an understanding of what information users are downloading, printing and exporting from the system. The DSI system and method may report to a user after analysis:

What data is being transferred (functional domain, sensitivity, . . . )
From where to where?
How much, how often?
Over which mechanisms (RFC, ALE, download, . . . )
Involved user accounts, batch processes.
This may answer questions such as:
What or who is the biggest exporter of data quantity, and which functional domain is affected the most?
Where is the financial information being exported to? Desktop? other systems? which ones, by which mechanisms?
Which functional domain is exporting most data?
What are the accounts being used to export data? This could help to improve the authorization concept in use and improve control over access to the data.

Further, appropriate counter measures may be taken when suspicious activity is detected or in general with respect to sensitive information. In addition, specific notifications on strange exchanges or dubious exports may be provided. It will also allow further improvement of the level of detail the classification shall deliver, based on user internal processes and risks.

The system and method may display an almost live map of the data exchange of a system, or systems, as information regarding several systems may be combined together to give an even more detailed information flow analysis based on the classification of the data.

The installation of the DSI system and method of the present disclosure is preferably relatively simple with a basic set up procedure. In a preferred embodiment, it is generally unnecessary to configure it for individual RFC connections as they will be detected automatically. System log information is generally available in most business applications such that minimal enhancements and modifications should be necessary to implement the DSI system and method of the present disclosure.

One exemplary embodiment on an SAP Netweaver would be able to capture the existing technologies RFC and IDocs. Should any rare other customer specific issues arise, the application can be easily enhanced or modified to cover those cases as well. Web-services are built on top of RFC's and will be essentially transparent.

The system and method of the present disclosure are preferably implemented as a combination of individual implementations on business applications and systems. In a preferred embodiment, information regarding data communication is gathered from existing information in business applications including log files, connection information, business information, location, storage, user information, and user rights. The system and method may use active or passive monitoring of incoming and outgoing data connections on the systems. The connection information may also be used to identify the communication partner, as well as collecting system name, type, location, IP address, requesting user, user agent and operating system information.

In a preferred embodiment, all of this information for each implementation is combined into one unified or universal dataset or report after analysis. This dataset will uniquely identify each communication partner at any given time and includes details regarding business content of the communicated data without disrupting the information in the communication. The combined or universal dataset or report provides the ability to see the most common communication partners, new communication partners, types of communication partners and an idea of the information exchanged between all business applications in an enterprise environment, either individually or as a network.

To reduce the amount of information to be stored and analyzed, otherwise identical communication events within a specified amount of time may be aggregated in an aggregation step. In an embodiment, per default, all equal communications within one second will be summarized and merged into one data record, at the cost of losing time detail smaller than one second. This can be taken further, if desired, by increasing the time unit to up to a month. This aggregation step is, however, optional.

Based on the collected information, two different possibilities arise. The information can be analyzed on the application or system itself, giving an extensive view over all communication from and to that system. Or it can be combined with other information from other applications or systems where the invention is running and providing a comprehensive and in-depth view of all communication between all systems in the enterprise environment. That is, each implementation of the system and method may be used to provide detail regarding communication into and out of that business application or other element, such as a printer database or client computer, while a central implementation of the system may provide details regarding communications between multiple business applications, clients etc.

Disclosed are a method, system, means for implementing the system, and a non-transient computer-readable medium incorporating a program of instructions configured, when executed by an automated data processor, to execute the method. In a preferred embodiment, the system gathers information regarding communications between business applications, simplifies or otherwise normalizes the information, classifies the data and then analyzes the data to provide a report to the user regarding the information that is communicated. Aggregation of the data may be included to reduce the overall size of the data that is processed, if desired. The report may be presented using various data visualization or graphical tools in a format meaningful for the user or administrator. The present innovation provides the ability to monitor information and the information transfer or communication through the network while classifying the communicated data based on the content thereof to identify and track and secure proprietary and sensitive information. The innovation might only cover a subset of the data flow and/or a subset of enterprise systems and business applications, or services as desired.

Enterprise application software and systems, and services, such as those provided by SAP SE, for example, may include software applications to process human resources, intellectual property, business intelligence, enterprise application integration, enterprise forms automation, customer relationship management, billing, project management, accounting, payment processing, product catalog, financial processing, and to provide other business functions. That is, there are a variety of business applications that all communicate with each other in a single enterprise environment.

Each of these systems may run several different services, each service could have several different connection interfaces over which business data is being exchanged with other services, systems and clients. Such data flows may be both between proprietary and public systems, both between systems within a particular enterprise applications suite (or system) and without, both between systems internal to a company and external. Or several services may also serve the same interfaces and only a subset of the functionality of the overall business application, any such service could also be the client of another set of services. The respective interfaces and services might be covered by the innovation by one, or a combination of listening modules.

The system and method of the present disclosure monitors communications between these different services and modules in order to provide surveillance and increased security for proprietary business information involved in these communications. FIG. 1 illustrates an exemplary block diagram of a DSI system 100 for monitoring and securing data communications between business applications. The system 100 may be implemented in a computing device that includes a processor or controller including but not limited to a server, laptop, personal computer, or other similar device. As illustrated in FIG. 1, the system 100 preferably includes at least one listener 20a, 20b which gathers information regarding communications. In a preferred embodiment, a log file listener 20a is provided to gather information regarding data communication from existing logs of a business application or service. An external listener 20b may be used to gather information regarding communications to and from external components. In one example, the external listener 20b may listen to a network stack of an operating system to determine how much information is passed. The external listener 20b may also monitor communications traffic with external applications or systems as it happens. It is noted that the system 100 does not require both listeners 20a, 20b and only one listener may be used, if desired. In addition, the system 100 may incorporate or be connected to additional listeners which may be associated with either the same business application or other business applications, systems or databases. Where two or more listeners are used, the information from all the listeners is gathered for further processing. Once this information is collected, an enriching element 22 may enhance the collected data. The enriching element 22 may derive and add additional information based on the environment of the data itself. For example, the enriching element 22 may be able to add geographical information that corresponds to the IP address related to the data. In another example, a generic java business application may not provide information regarding its functional domain, i.e. finance, HR, accounting, etc. This domain information, however, may be determined and added to the gathered information based on information provided from an external source. It is noted that the enriching element 22 is preferred, however, is not necessary and the system 100 need not include the enriching element. The enhanced data is then merged and normalized by the simplification element 26. The information, which is gathered from a variety of sources as noted above, is normalized, such that it can be further processed more easily. For example, the information may be normalized with respect to IP address or time stamp as is described in further detail below. Once normalized in the simplification element 26, the information can be more easily classified by the classification element or engine 18. Classification may be based on data content and may be used to help determine the sensitivity of the data that was communicated. Data content and sensitivity may be based on a variety of factors including sender information, source information and recipient information. For example, certain business applications, such as an accounting program, for example, may routinely transmit sensitive financial information such that any communications related to this application might be classified as sensitive. The classified data may be aggregated by aggregator 16 in order to minimize the volume of data that must be stored in the storage element 30. As noted above, the aggregator 16 may aggregate repetitive data regarding communications that occur within a given time period. Alternatively, this aggregation may take place prior to simplification and classification. While aggregation is useful in that it reduces the size of information to be stored, it is not strictly required and the system 100 need not include the aggregator 16. The information is preferably stored in storage 30 and is analyzed using the analysis element 12 to provide report information regarding the data communications to a user via the user interface 10. The information may simply be provided to the user in a list or may be displayed graphically via a dashboard or other graphic. In addition, analysis of the data may trigger an alert message to the user where analysis indicates a suspicious pattern or destination for sensitive data. In addition, analysis may trigger a blocking message to block further communication based on a selected sender, a selected receiver, a selected database, etc. or to terminate a current communication.

The listening modules 20a, 20b may either be implemented passively by collecting, enriching and/or combining existing log information (using log listener 20a), or actively by monitoring the live connections between one or more specific application or system and its their clients, servers (or both servers and clients) (using external listener 20b).

Figure 9:
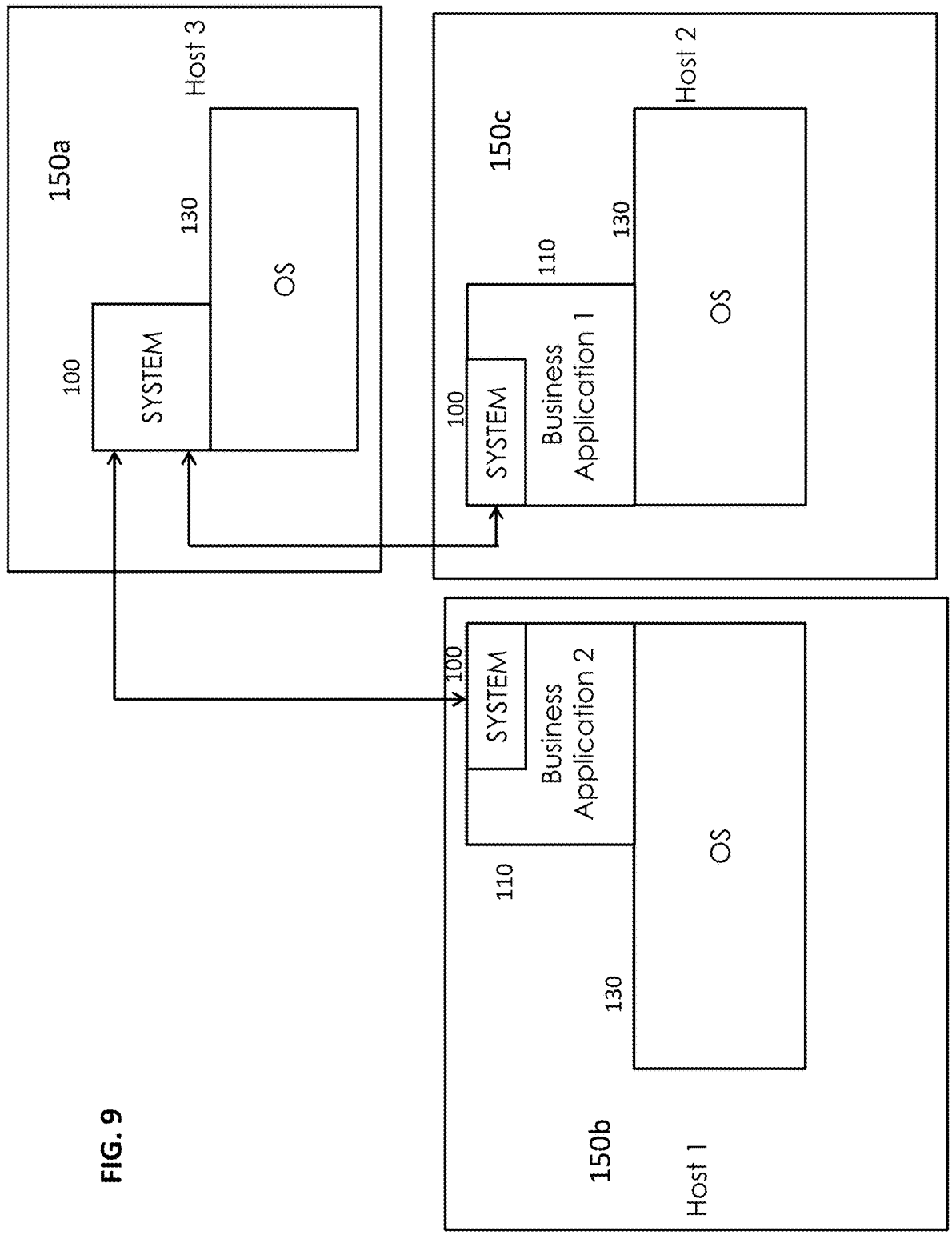
FIG. 9 is a block diagram illustrating multiple exemplary computing devices in communication with each other, each of which includes the system of FIGS. 1-3 in accordance with an exemplary embodiment of the present disclosure.

More than one such data collection approach may be provided over several different services, systems and interfaces or on a subset of systems, services and interfaces. In an embodiment, each data source, i.e. business application or service, includes the system 100 described above that gathers information and provides a report on communications into and out of that entity. The report generated by implementation of the system 100 may be provided to a central repository in which all data is aggregated and the user can view an aggregate report and/or individual reports from each application. FIG. 9 illustrates an example of such a system and is discussed in further detail below. Alternatively, the gathered information for each application may be collected and then sent to another system 100 and combined with that of other applications before being simplified, classified and analyzed, if desired.

In order to be useful, the information that is gathered by the listeners 20a, 20b will preferably include Connection timestamp, Connection partner (IP; ID, Username or similar), Connection Type and flow of the data (Inbound, outbound) and Business context of the information or unique identifier to clearly map the connection to the business context. Context information could be done by individual identifiers and then provided from outside. For example, a web address such as /var/fin/booking, would be ideal or a unique ID like 6j7LZ, that maps directly to a business endeavor is also suitable. The more information the business application or service can provide regarding communications, the more detailed the reporting will be by system 100. The listeners 20a, 20b preferably collect data from multiple places (API, Logfiles, business application specific databases, External data lists and content of traffic being communicated and others).

In a simple example, the log file listener 20a may access existing log files of the business application or system, or otherwise, and read out the data therein. The listener 20a may be implemented as a watcher which accesses a log file when and if there is a change therein, or may simply operate periodically. In addition, information may be gathered using enhancement of current system tools such as an API call for information. This may be accomplished by using an API of an application server and/or providing an API for other systems to feed information read from transactional databases to recognize new events.

Figure 2:
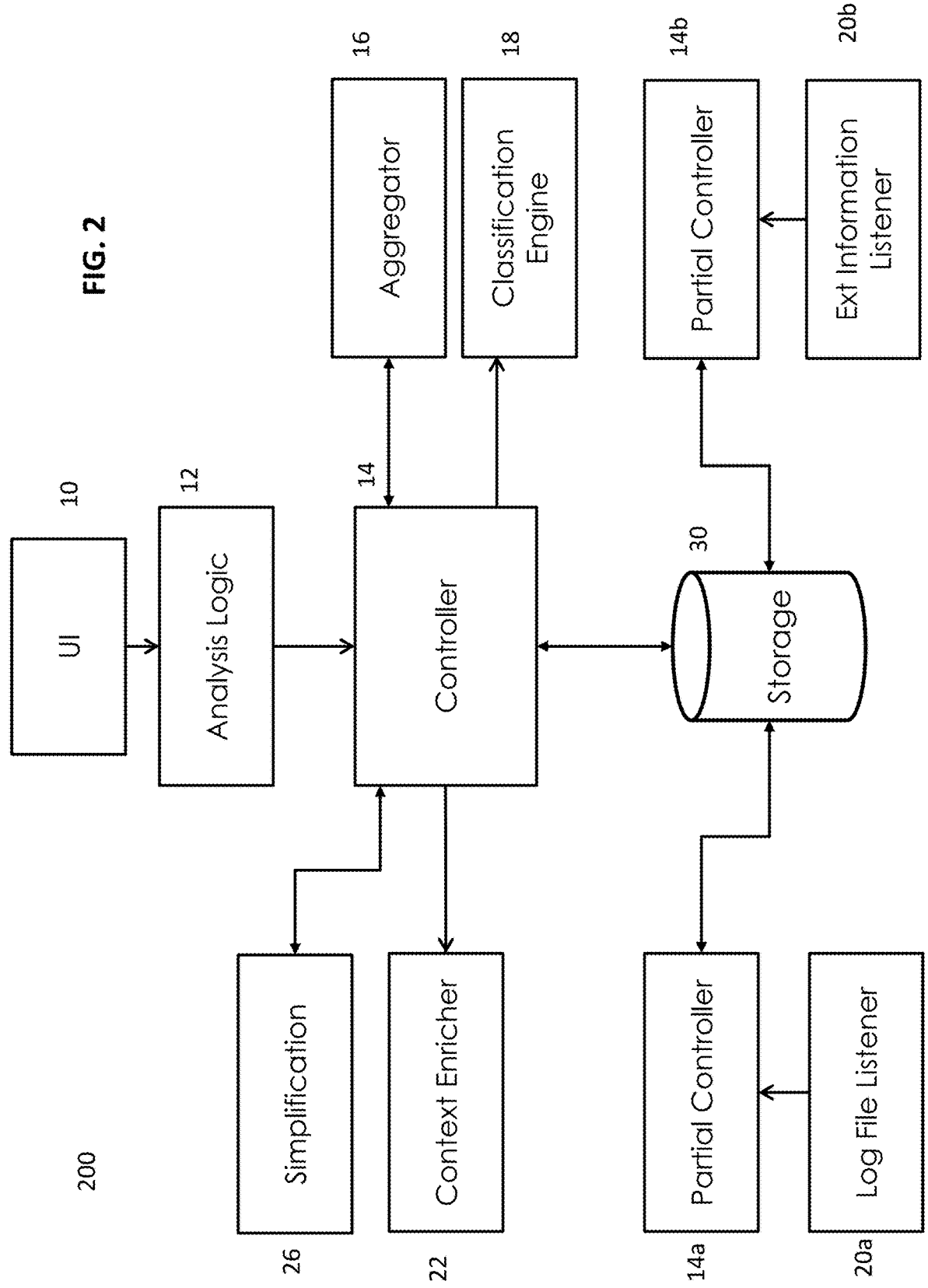
FIG. 2 illustrates another exemplary block diagram illustrating a system for monitoring and securing data communication between business applications in accordance with an exemplary embodiment of the present disclosure.

In the embodiment of FIG. 2, the system 100 includes the elements of FIG. 1 but also includes additional elements. In this embodiment, the listeners 20a, 20b are connected to partial controllers 14a, 14b, respectively which control storage of data gathered by the listeners 20a, 20b in the storage element 30 This information is retrieved from storage 30 to undergo further processing under direction of the controller 14 by the simplifier 26, the classification element or engine 18, and analysis element 12, and optionally the enricher 22 and aggregator 16 as described above. The simplification element 26 of FIGS. 1 and 2 merges the collected information into a common form so that further processing is possible. This merger or normalization of information may vary depending on the business application or server involved. However, in one example, normalization may be based on IP name and address. For example, one can find information from a log file including the name IP and the value 10.41.8.87. Reading from a different position of the same system (e.g. query the system itself) the corresponding name is ip_address and the value must be the same. Thus, in an embodiment, normalization may be accomplished in accordance with the below pseudo code:

Query system with IP as ip_address
    Drop ip_address from answer
    Merge information into existing log
    For each entry in log
    Execute external information has PII with information data_source
    Drop ip_address source from answer
    Merge information into existing log Normalization may also be based on time stamp, if desired.

Further, as noted above, the aggregator 16 may be used to aggregate entries based on time. Some entries are identical, except for the time stamp and the amount of data exchanged, and hence share basically the same key information. Based on this idea the aggregator 22 combines information as follows:

Two additional fields are required:
    NumberOfEvents: Number of equal events in the time period
    AggregationLevel: Time by which the equal events are merged together, Second, Minute, Hour, Day, Month
The information is aggregated like that:
    If aggregation threshold passed
        If entries are equal (except for time) and aggregation threshold has been passed
            Check if time is within aggregation level
            Merge elements together and summarize NumberOfEvents, DataIn and DataOut
            Reduce time detail by aggregation level (e.g if aggregated to hours, time stamp will not specify minutes and seconds)
            Set new AggregationLevel This aggregation may be triggered by a simple mechanism, either as a recurring background job or triggered by incoming new events. Depending on the configuration of the jobs and the aggregation threshold, aggregated entries will be further aggregated into entries with less and less time details. Aggregation, however, is optional as it results in the loss of some accuracy which may not be desired. If the entries are merged together it will be close to impossible to see which action did happen after another in exact time terms.

In an embodiment the gathered data may be sorted into a variety of categories as follows:
Source system information
Destination system information
User Information
Context Information about the data being exchanged
Numeric values (data in/out, number of exchanges)

Each category provides specific information that can be used to analyze the information at hand For example, one can determine which user downloads the most and request more information about the user (when available). In another example, a determination can be made as to which partner system provides most of the financial information. This information may be used by the classification element 26 to determine sensitivity of information communicated. For example, the information gathered indicates that financial information is being communicated, based on the presence of numeric values and perhaps user information. Based on this, the information may be designated as sensitive or highly sensitive.

Classification of the data provides for unique functionality unavailable in existing monitoring systems. Classification of the information may be with respect to different types and styles. Most commonly the classifications relate to the data context information to detect sensitivity and/or business domain of the information. The only requirement the classification must sustain is to provide the result in a compatible way and to be able to derive additional information from the information. The classification, for example, could derive user importance from the user name and the application used and for additional benefit could query a user service. Such additional information then can be used to further process and filter the data in the analysis element 12. The classification information is preferably stored in storage unit 30 with the individual record regarding the communication, however may be in a state table simply linking to the initial data to avoid mixing source and processed information.

Classification allows for a more detailed view of the information that passes in between the systems. It allows for a more focused analytic, more detailed view on the information and easier specification on the action being taken on the data. As a result, the complete traffic between the supported applications and systems is not only monitored but also classified, allowing the company or other user to have a detailed overview over the risk, type, category and volume of information flowing between critical business applications.

For example, a database table may include the password hashes and usernames of all users on a certain SAP system. It may be desired that no external application have access this information. The system and method of the present application may be implemented to provide this security. The following is pseudo code describing the steps implemented to protect the information which is stored in the table which is named USR02:
If information contains table name USR02
Send e-mail to risk owner
Include information: timestamp, user account, source system, destination system
Based on the classification derived from the information:
If classification equals high risk
Send e-mail to risk owner
Include information: timestamp, user account, source system, destination system Passive data collection may entail reading log files and log bases as generally discussed above, but also may include reading trace information, or centralized log services and is generally performed by the listeners 20a, 20b. The information for such log files may be aggregated to an application external of the application/service/interface to be monitored. Passive data collection might be implemented as a scheduled task, collecting the information of a time-based periodic interval, or as a listener or watcher activated when new entries into the log structure are detected. The passive data collection may also enrich the collected information with additional external sources. Such external sources may include logged-in users, time stamp, system location and other data collectable based on the environment the collector runs in.

For example, a Java-based financial business application generates two different log files based on the exchange of data with another software application, as well as information about the logged in users at a particular moment in time. The listener would scan through both log files that exist in a particular directory and combine the information in order to gain insight into which user at which time transmitted which data.

In active data collection during the data exchange between the services, systems, clients and its used interfaces data would be collected. In order to collect this information, the listener 20b might be implemented as an enhancement or modification of the system, interface, or service to be watched. For example, this may be implemented as a additional layer in between the physical network, the operating system and the interface. During the monitoring, the listener 20b need only collect as much information as absolutely necessary, in order to keep load on the actual data exchange as small as possible. In effect, the listener may monitor only based on metadata the exchange possibly generates. However, if this is not sufficient or not applicable, the listener 20b might look at the data itself or a combination thereof.

An example of active data collection is enhancement of the well known SAP SE anti-virus function with an information-collecting consumer. This function is triggered whenever a document is being downloaded from an SAP application server through its delivered UI. The listener would then normalize or standardize the collected data. The listener may be implemented via SAP specific means (e.g. ABAP) or tools of any other business application software.

According to one implementation, the listeners, by e.g. interface, type, function or data, allow for exceptions that are excluded from monitoring even if they would normally be cached. Such exclusion information can either be built into a particular collector or listener, if feasible for all possible scenarios, or configured in a data holding format and adjusted individual by a customer. Examples for such scenarios are system internal calls over the same external exposed interfaces, but the data may never physically leave to another system/service/application.

The information these types of listeners provide may be enhanced with additional static information, configured per collector and saved as a configuration file or the like. Such static information can include additional information that enhances the collected information in regard to application purpose, application context, application functional domain and other relevant information supporting the purpose of the invention. This is the type of information derived and/or added by the context enricher 22, for example.

For example, imagine a custom financial application written in a compiled language, such as C. The log collector may collect all connections and the client user using the application. It, however, does not know the functional domain (finance, HR, etc.), based on the information provided by any collectable information. However additional static information may provide this information.

Active and passive collection of data may be combined. For example, a particular listener may implement a basic active listening on an interface, and this information may be supplemented by passive data collection, or the passive data collection may be generally used for an interface but may be supplemented by data collected using an active listener. Most data listeners or collectors may incorporate one or more of the above-mentioned data collection functionalities so as to gain more data and insight into the system and information flow.

Most of the data sent via a business application and its interfaces is stored in some kind of database. Databases may allow access not only from a business application, but also through different means. This is another layer of potential important data leaving the system.

According to an aspect of the disclosure, additional listeners may be implemented specifically for monitoring database access. This type of listener may be implemented via the external listener 20b discussed above. In an embodiment, a dedicated listener may be provide for each of the systems or applications that a user wishes to monitor. However, it may be sufficient to supervise only actions that do not originate from the business applications themselves. Databases may already provide this functionality, in which a system or device according to the present disclosure may collect the data from files and/or tables or the data may be pushed from the monitoring feature of the database. In other cases, a system or device according to the present disclosure may suggest closing external access to the database or alert a user when access to the database has been detected, as in the example discussed above.

According to an aspect of the disclosure, a data collecting listener as described above may be used specifically for the databases. The database model being used may determine the specific implementation of such a listener.

Data from two or more listeners or sources may be combined. One such source may be a printing process initiated by a business application that allows printing of documents without a specific print log.

The business application writes access to and connection time into a log file on the file system, and in addition the same log file saves the printer that has been used for each print job. In addition, the business application may technically be enhanced via add-ons. Such add-ons can access a lot of information from the business application itself, such as log in time of the users, functional domain of the users and their actions.

In such a scenario, a system and method according to the present disclosure may access the printing process to listen for the individual print event. The print event itself however may often supply insufficient information. For example, only the user's identity may be provided. Accordingly, a system, method or device according to the present disclosure may need two other listeners to provide a correct log.

This may enhance information regarding the user by a listener that uses the enhancement function. The secondary listener may collect data from the log file. All such collected data may then be merged together into a common data format and a proper log of information may be generated and utilized to create an audit trail of all print jobs on this particular system.

The information collected on each system, service, application or interface should to be unified or standardized after being collected independently. The data normalization may entail a multi-step approach as is noted above with respect to the simplification element 26. Initially the interfaces belonging to the same service may be merged together. The definition of such a mergeable unit is a logical entity. A (logical) entity is a system, server, machine or other logical processing or storage unit by and with which data is exchanged over possibly several interfaces inbound and outbound.

An entity can correspond to e.g.:
An SAP "logical system" (i.e. a client on an SAP system)
A cloud tenant (e.g. a MS Azure tenant, Dropbox)
A user's front-end (client, PC, file system)
A windows server application or Java business instance
Other similar such business applications that influence the data processing of business data Not all applications or systems in a network need be monitored. The system and method may focus on the particular risks and concerns of the organization or vendor regarding the flow of business valuable information. Hence other possible applications or systems falling under the specification of an entity, need not be covered unless they add value to the surveillance of business data. In a similar vein, it may be necessary to provide categories and/or groups of entities. For example, listing individually all 20,000 front-end PCs to which data have been downloaded may be undesirable or unfeasible.

Every data source (Download log, IDoc DB, RFC statistical DB) may need to implement a mechanism (or re-use an existing one) to translate (or map) its own representation of the collected information into the common format shared within an entity. A particular data exchange may be considered concluded, when the connection has been terminated or when the processing of the request within the host entity has been finished and the result transferred back. The information of such a request will then be extracted and pulled or pushed into the separate log of the system. An example of such a request, its unification and an entity can be found below:

Example of this simplification on a SAP system (entity) is described below.
For IDocs, that should always the SAP Logical Systems
For RFCs, that could be:
SAP server name+client (SVLU0406_SE1_00+100)
SAP System ID+client (SE1+100)
Host name (SVLU0447) if not called from ABAP
IP address (10.41.9.84) if host unknown and not called from ABAP
For downloads, that could be:
Front-end host name a.k.a. terminal
Front-end IP address.

This entity-specific unification will simplify any subsequent step, based on the collected metadata.

Example for querying a data provider:
A data provider/interface shall be queried by specifying:
time stamp from/to
summarization: yes/no;

if yes: time bucket specification (size/duration, time zone)
partner entity/entities
direction.

A data provider may expose a similar set of data with a structure split between a header and a data component. A header may contain basic information in order to correctly categorize the specific request. In all cases it needs to be clear, which entities or applications are involved, at which time, during which period of time and the type of communication. The listeners might collect more information than what they require for data unification or standardization, however the non-unified collected information can be used for additional classification, which then by itself may be thought of as a unification.

The following is exemplary pseudo code:
If individual record:
  GUID of original record
  time stamp
If summarized record:
  time stamp "from"
  time stamp "to"
  bucket type? identifier? (identifier might be required for detail display callback)
Communication
  my entity
  partner entity
  type of communication (download/mail/IDoc/RFC/ . . . )
  direction of communication (if bidirectional: who initiated)
Data
  classification (normalized, flattened; need not be deep)
  number of events (if summarized record)
  quantity of data: outbound (me to partner)
  quantity of data: inbound (partner to me).

The collected data at this stage can be enriched with system specific classification. Data classification translates and enriches the information to even further abstract categories. The classification for example, may extract the functional domain based on the collected information and may add the extracted functional domain into the classification element of the data. Or, the classification might add a basic risk assessment on the data exchange, based on all information collected and a mechanism to do so.

Figure 15:
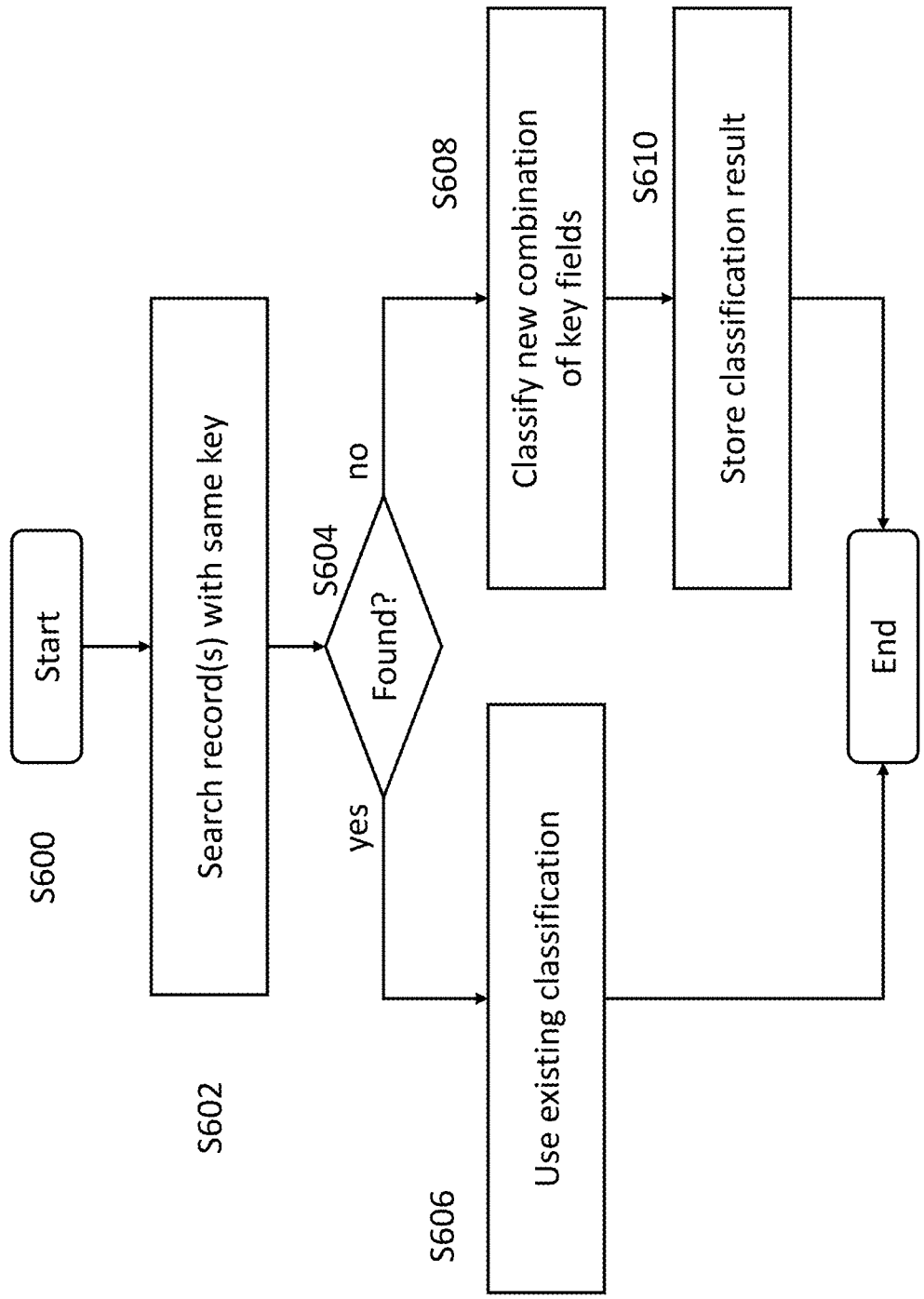
FIG. 15 is a flow chart illustrating an exemplary method of classifying the normalized data in accordance with an exemplary embodiment of the present disclosure.
Figure 16:
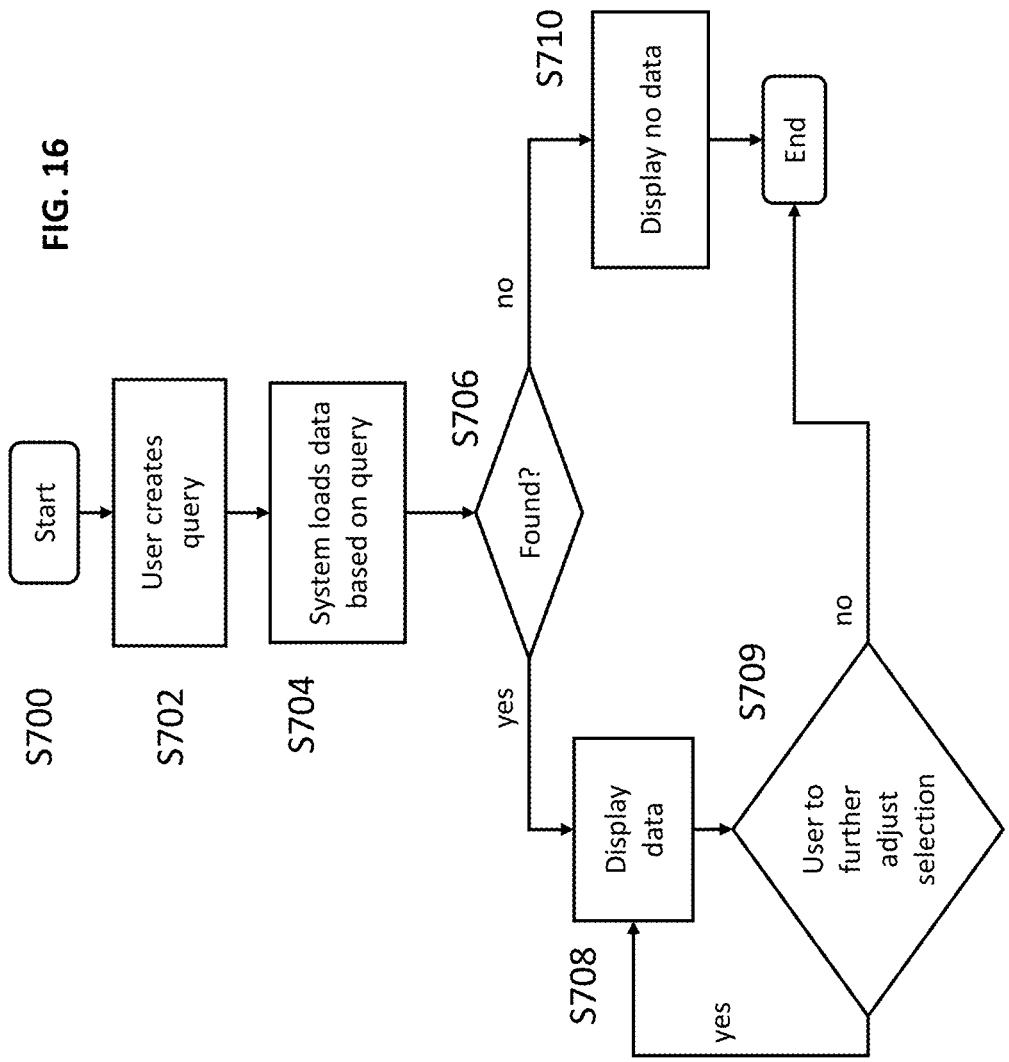
FIG. 16 is a flow chart illustrating an exemplary method of analyzing the classified data in accordance with an exemplary embodiment of the present disclosure.

In an embodiment, the classification element or engine 18 may classify data in accordance with co-pending U.S. patent application Ser. No. 15/074,103 entitled CONTEXT-BASED DATA CLASSIFICATION filed Mar. 18, 2016, the entire content of which is hereby incorporated by reference herein. FIG. 15 illustrates an exemplary flow chart of a method suitable for implementation by the classification element as well.

The analyzed data is ready for graphical, statistical presentation of this particular entity and its communication partner entities. At least the following examples of graphical or textual display could be built with the information now normalized trough the invention:
  With which other entities (applications, services, systems, devices, users, organizations, departments of the organizations, countries, regions or other geographic areas) this particular entity has communicated
  At which frequency
  When was the most recent communication or data flow
  What direction
  What amount of data
  What type or format of data
  What functional domain (finance, human resources, etc.)
  What sensitivity the exchange has.

This is one possible example of a result of the present invention. The logical data held may be visualized as a multi-dimensional cube or matrix to provide flexible and relevance of data for the user to whom it is presented on the user interface 10. However any data structure that allows for a flexible interpretation of the data unified can be used.

Figure 3:
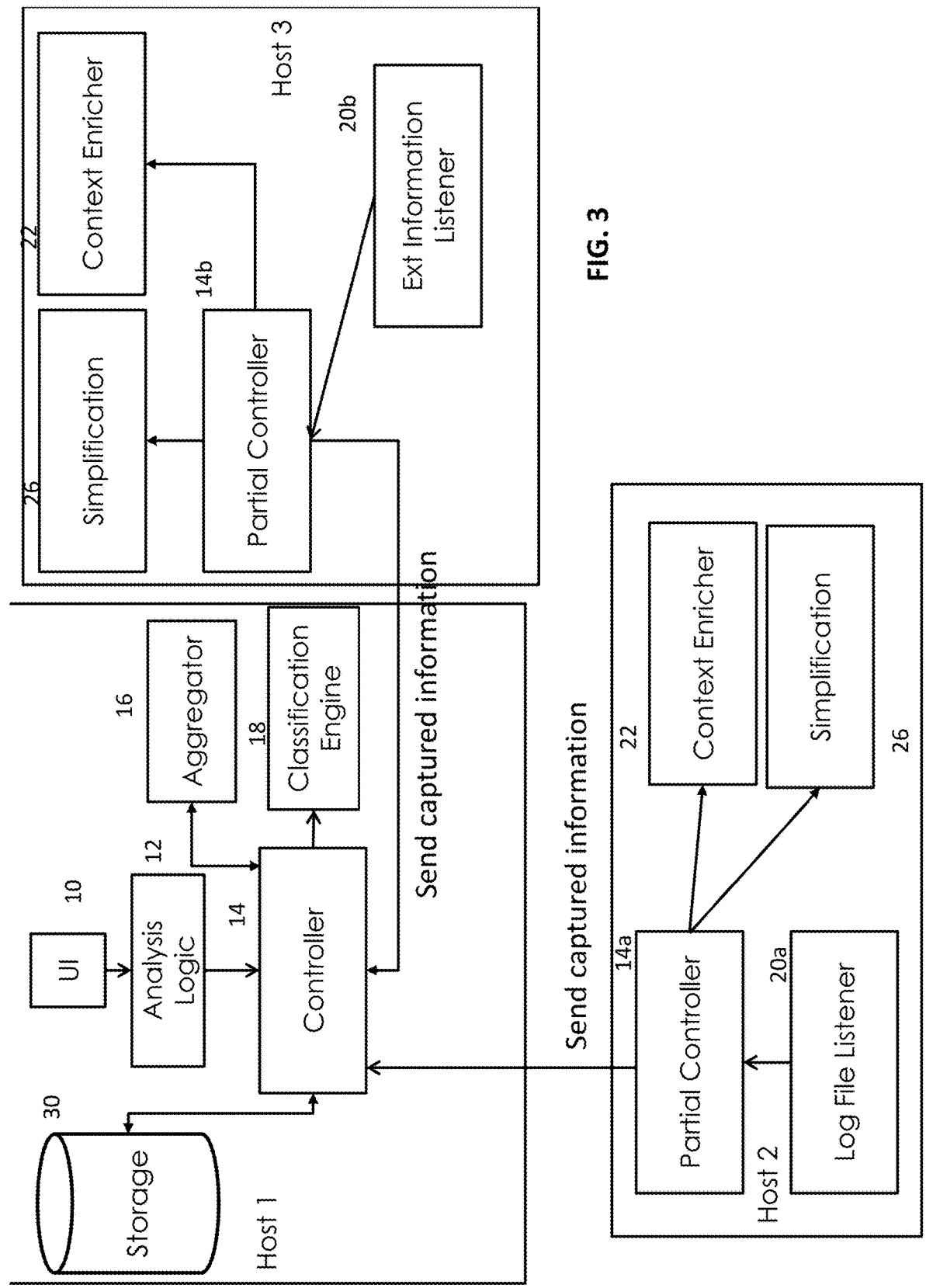
FIG. 3 illustrates an exemplary block diagram illustrating a system for monitoring and securing data communication between business applications in which elements of the system are divided between different host applications in accordance with an exemplary embodiment of the present disclosure.

FIG. 3 illustrates the system 100 with the various components thereof spread out between multiple host applications or devices 150. In this embodiment, enrichment and simplification may be done locally for information gathered by each of the log listener 20a and the external listener 20b at each host with the results then communicated to the host including the controller 14 and storage 30 for aggregation and analysis. In this case, gathering of information by the listeners takes place locally with processing of this information provided remotely.

Figure 4:
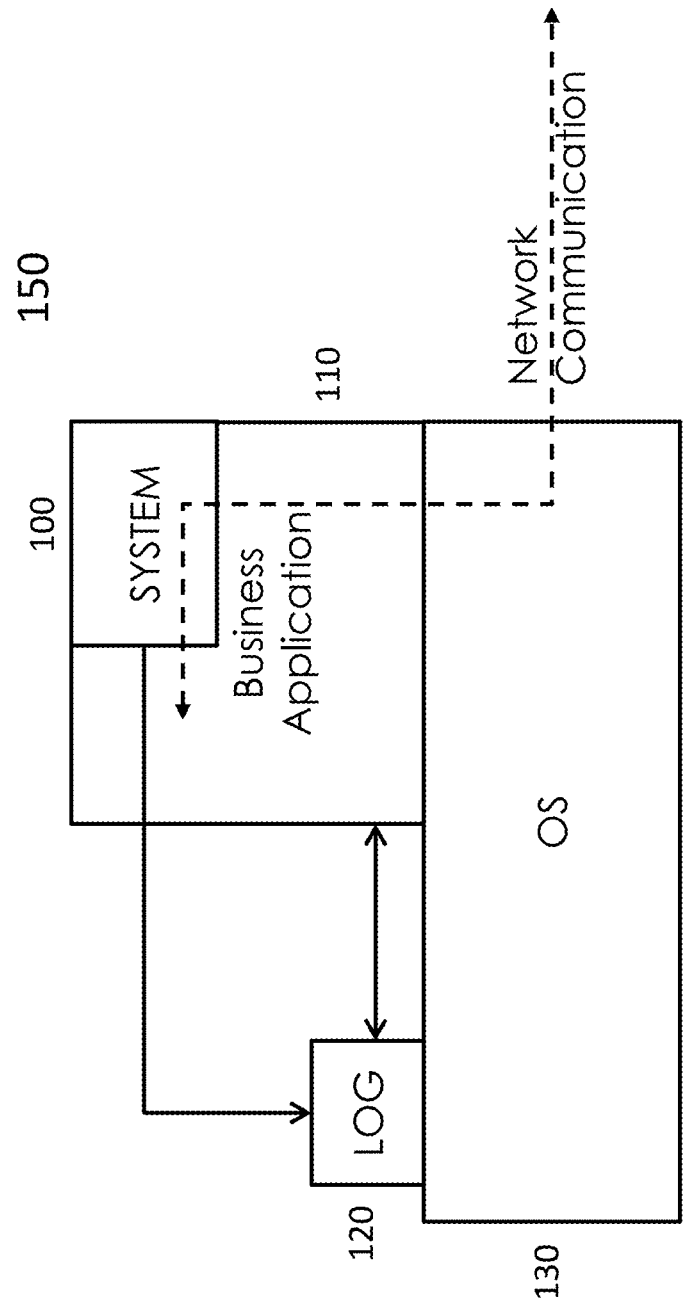
FIG. 4 is a block diagram illustrating an exemplary computing device including the system of FIGS. 1-3 in accordance with an exemplary embodiment of the present disclosure.

FIG. 4 illustrates an exemplary block diagram of a computing device 150 that may act as a host for the system 100. As illustrated, the computing device 150 includes at least an operating system (OS) 130 with a business application 110 that utilizes a log file 120. As illustrated, the system 100 may be implemented in the business application 110 to monitor communications into and out of the application. The system 100 gathers information from the log 120, as noted above and based on external communications using listener 20b, for example.

Figure 5:
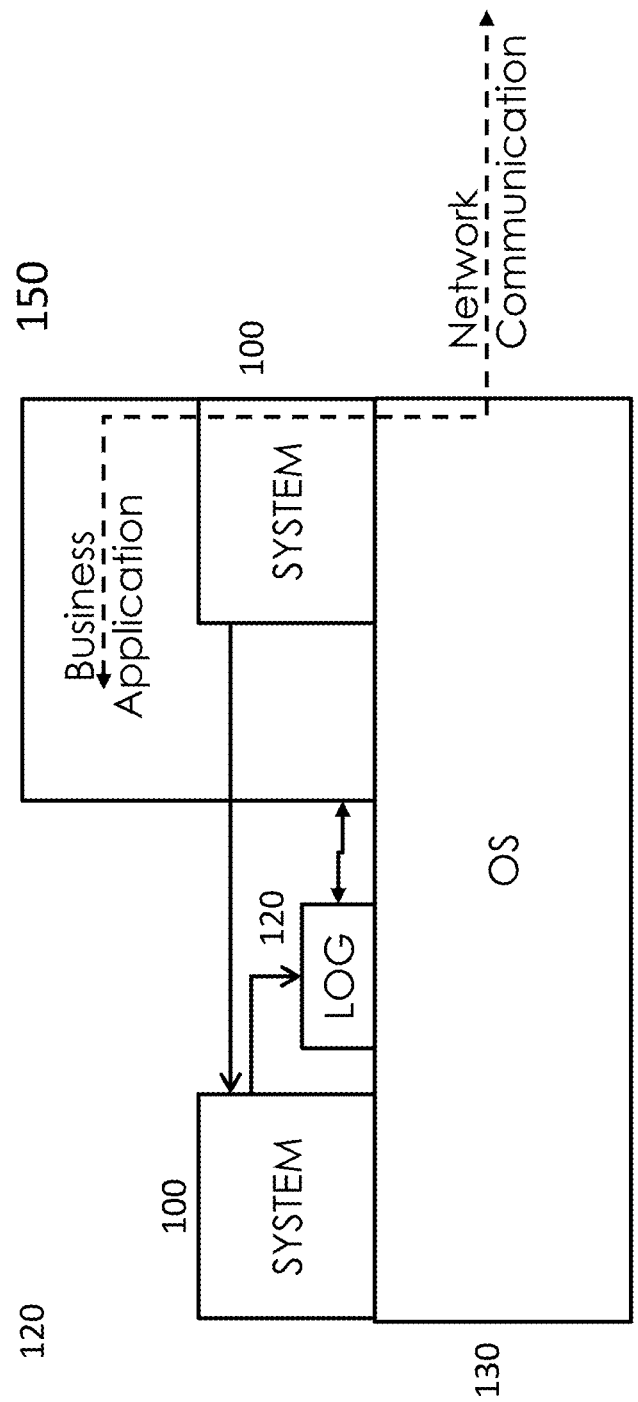
FIG. 5 is a block diagram illustrating another exemplary computing device including the systems of FIGS. 1-3 in accordance with an exemplary embodiment of the present disclosure.

FIG. 5 illustrates another exemplary block diagram of a computing device 150 that may act as a host for the system 100. In this embodiment, two instances of the system 100 are provided in the computing device 150 with on instance included in the business application 110 and the second instance in communication with the first instance and in direct communication with the log 120. In this embodiment, the system instance in the business application 110 would not require a log listener 20a and the other instance of the method 100 would not require the external transaction listener, but would aggregate its own report with that of the instance in the business application. Alternatively, the gathered information from either instance may be provided to the other instance for further processing such as simplification, classification and analysis and combined with the information of the other instance. The instance in the business application would preferably be integrated into the business application (e.g. via API, extension mechanisms or injection, for example) to collect information from within the business application based on communication therein. This embodiment is useful when the business application is enhanced but remote from the rest of the computing device.

Figure 6:
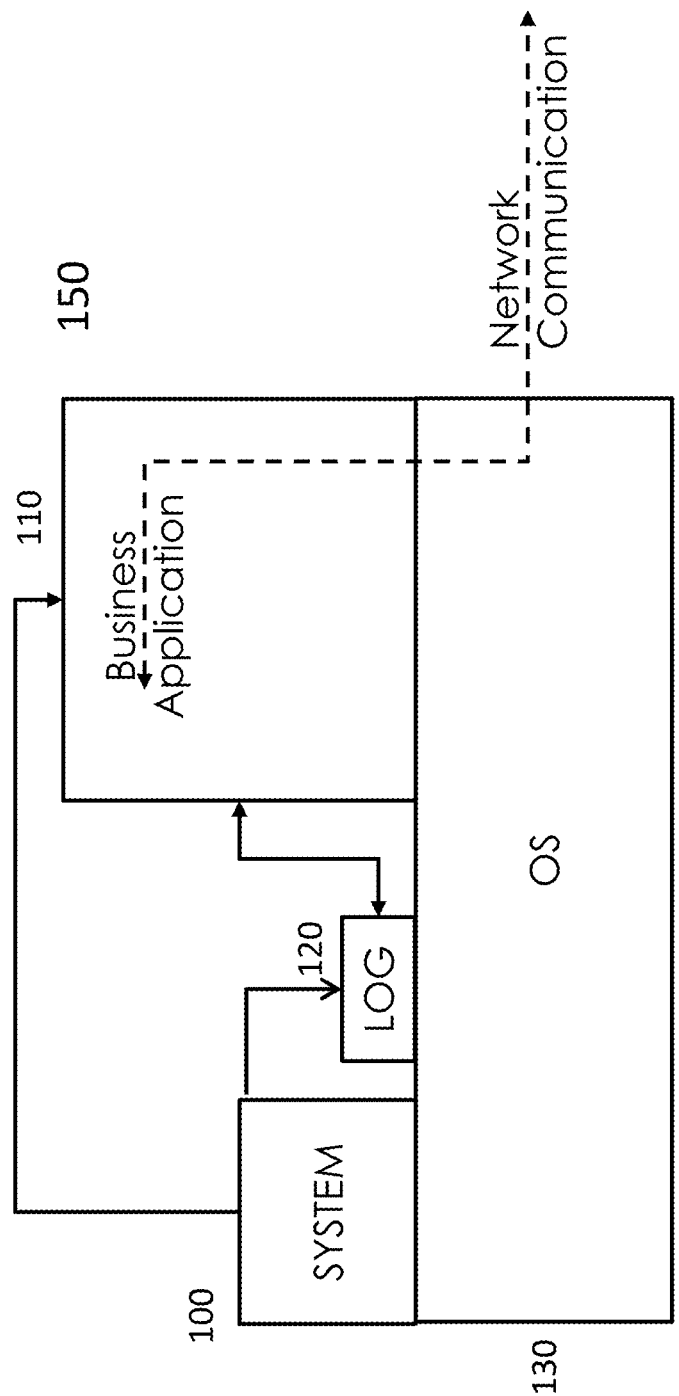
FIG. 6 is a block diagram illustrating an exemplary computing device including the system of FIGS. 1-3 in accordance with an exemplary embodiment of the present disclosure.

FIG. 6 illustrates another exemplary block diagram of a computing device 150 that may act as a host for the system 100. In this embodiment, the system 100 is provided independent of the business application 110, however, the external listener 20b is preferably in communication with the business application to monitor communications thereof while the log listener 20a is in communication with the log 120.

Figure 7:
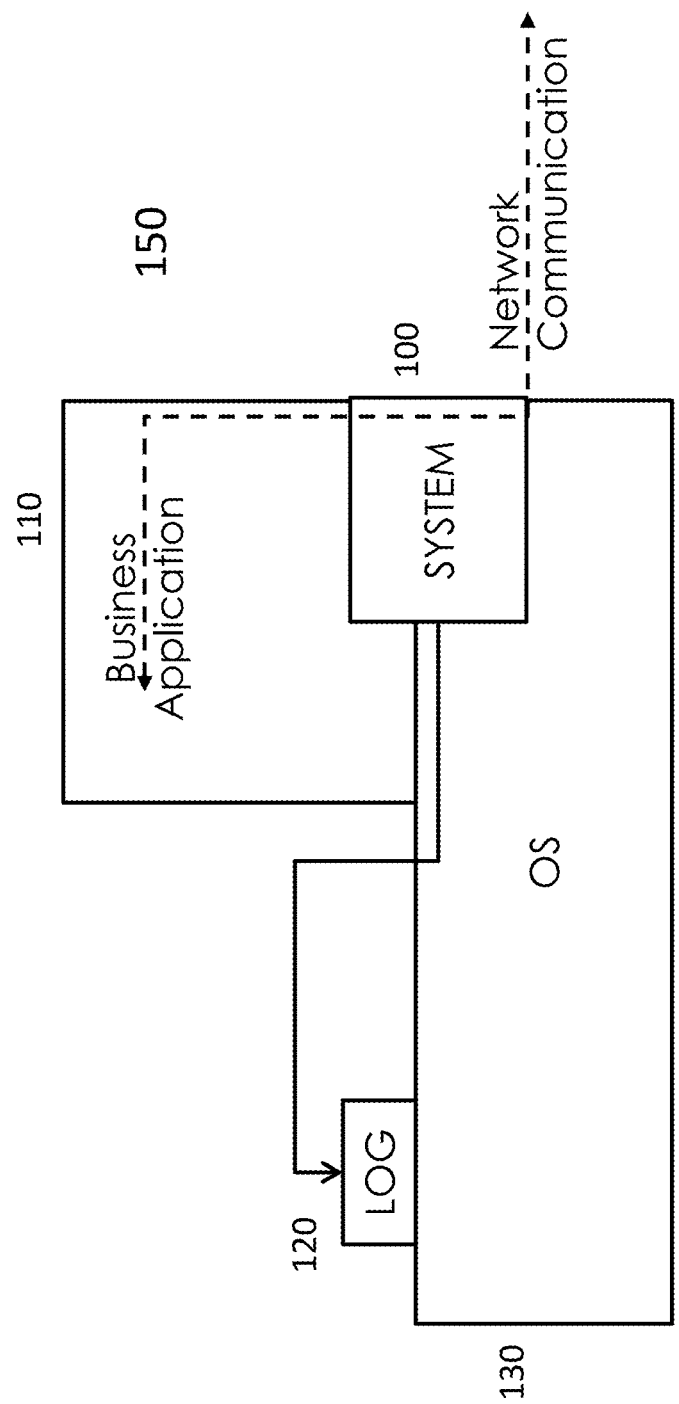
FIG. 7 is a block diagram illustrating another exemplary computing device including the system of FIGS. 1-3 in accordance with an exemplary embodiment of the present disclosure.

FIG. 7 illustrates another embodiment of the computing device 150 in which the system 100 is divided between the OS 130 and the business application 110.

Figure 8:
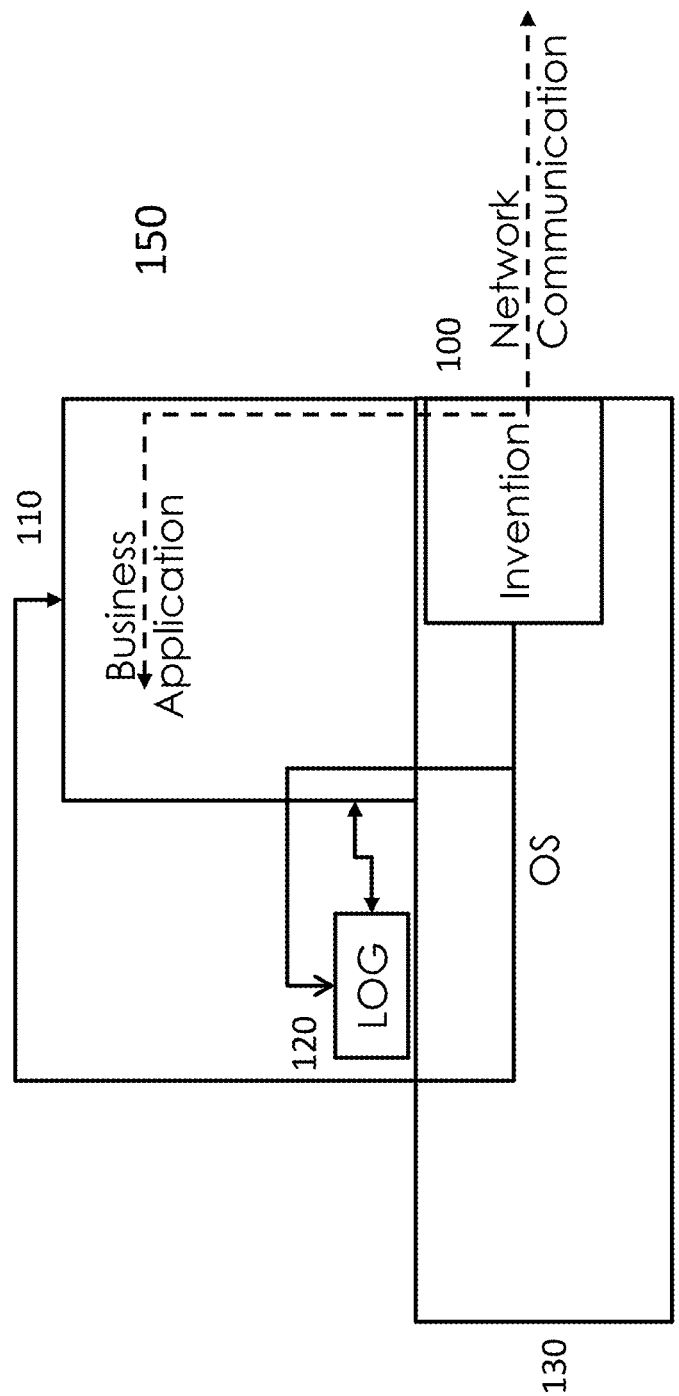
FIG. 8 is a block diagram illustrating an exemplary computing device including the system of FIGS. 1-3 in accordance with an exemplary embodiment of the present disclosure.

FIG. 8 illustrates another embodiment of the computing device 150 in which the system 100 is implemented in the OS 130 and communicates with the business application 110 and the log 120 to gather information.

FIG. 9 illustrates an embodiment in which three different host computing devices 150a, 150b and 150c are used to implement three different instances of the system 100. The instances of the system implemented in hosts 150*b* and 150*c* are provided in the business software applications 110. Both of these instances forward their reports to the instance of the method 100 provided in host 150*a*, which aggregates all report data to provide a single report regarding all business applications, if desired, or individual reports, if preferred by the user. The instance 100 provided in host 150*a* may also monitor communications in the host 150*a* and include this information is its report. Alternatively, the gathered information from the instances in the devices 150*b* and 150*c* may be provided to the instance of system 100 in device 150*a* which will further process the information as discussed above, that is, simplify, classify and analyze and report it in conjunction with information gathered by the instance in device 150*a*.

As noted above, the unified data of one entity or application may be combined with the unified data of other entities. If the different entities already have a unified data format, a super unification may not be necessary. In a different setup there might be a necessity to unify the data similarly to the initial step. The combination also may remove duplicates, or detect anomalies. For example if two independent entities have a data exchange protocoled at the same time, however with differences in protocols, this should be handled to remove redundant data. Thus a degree of data validation may be implemented. This is part of the simplification of merging and normalizing performed by the simplification element 26

The super-unification or combination of report data may enhance the view from one particular entity to the complete network of entities. This may provide the company the ability to supervise not only in detail, but also an overview of the business data flow, and the opportunity to understand where the sensitive data finally ends, whether this is a particular entity or a particular user. It could present the data exchange in almost immediate action and display the company a visualized map of exchanges and their accompanying classification (e.g. risk, functional unit).

The super unification of the information and data processing may be built as follows, however other architectures are also contemplated. While described with reference to particular entities and processes for purposes of illustrative example, other implementations are possible.

The unification of data at a particular host, such as computing device 150 above, may be built in to the application, to save resources on the super-unification. After the data has been collected and possibly unified it is either stored in order for a central instance to collect or it is pushed to the central instance, whichever communication pattern makes most sense. This exchange may occur through the existing interfaces.

A central application or instance collect or receive the data from the different entities and potentially applies the super-unification, based on mapping, algorithms and the like. In addition may enhance the classification view with the view of the overall data navigation. This embodiment is illustrated in FIG. 9, for example.

For example: an export from as SAP finance application into the Java-based financial application, might be marked as low risk. The subsequent communication of this information into a third system, for example cloud based, may warrant that the data transmission be marked as high risk. Or if the export of the same financial information might be acceptable to go to three different applications, however it might limit the possible control if five or six applications are involved in using the same data source, as control will be more difficult.

The reporting may be constructed in several different ways. Reporting information may be exported as a report document, displayed on the screen, graphs, numbers and summaries (See FIGS. 17-19, for example). Such reporting may be provided by a centralized instance of the system 100. However a report or presentation application may be used to provide the report, and the report or graph or visualization and the like may be sent to that particular system. The reporting or visualization may be customizable by the user to whom the report or visualization is provided. The user may wish to learn only about data transfers or flows between a first application internal to an enterprise application (or system) suite such as SAP, and a second application that is outside of the enterprise application suite, for example. Or, any data flows between applications internal to the suite and applications external to the suite may be of interest. Only data regarding such flows may be collected, or only data regarding such flows may be reported to the user. Or, the user may be interested only in data flowing from one or more or all applications internal to the suite to one or more or all applications external to the suite, or vice versa (only from external to internal). For example, such information may be relevant for the purpose of assessing licensing royalties for the suite of enterprise application/systems.

Thus provided is a technical solution to a technical problem. A computer-readable medium may include instructions configured as software, hardware, or firmware, for example, one or more or all of the data stream intelligence method and system or central instance or application, or any component that provides one or more of the functionalities, or any portion of a functionality, described herein. The means for accomplishing these functionalities may be any computer device component that provides one or more of the functionalities, or any portion of a functionality, described herein. A device may be a device that includes or executes such software, hardware or firmware. A computer system may include one or more processors in one or more physical units that includes such a device, or that performs such a method, or that executes the computer-readable medium, according to the present disclosure. Further, these computers or processors, including the data stream intelligence module, the system 100, or components thereof, may be located in a cloud or offsite or may be provided in local enterprise setting or off premises at a third-party contractor site. One or more component of the system 100 may be provided as software on a processor-readable medium, such as a hard drive, optical disk, memory stick, flash memory, downloadable code stored in random access memory, or the like, may be encoded as hardware, or may be provided as part of a system, such as a server computer.

The system 100 may be provided as part of a server, cloud-based resource, desktop, laptop computer, handheld device, tablet, smartphone and the administrator can interact therewith via various types of data processors, including handheld devices, mobile telephones, smart phones, tablets or other types of other communication devices and systems. Various types of memory may be provided in the computer for storing the information, including random access memory, secondary memory, EPROM, PROM (programmable read-only memory), removable storage units, or a combination of the foregoing. In addition, the communication interface between the major components of the system, or between components of the digital document classifier 30, can include a wired or wireless interface communicating over TCP/IP or via other types of protocols, and may communicate via a wired, cable, fiber optics, line, a telephone line, a cellular link, a satellite link, a radio frequency link, such as a Wi-Fi or Bluetooth, LAN, WAN, VPN, the World Wide Web, the Internet, or other such communication channels or networks or a combination of the foregoing.

Analysis of the classified information may result in a blocking order or message to prevent communication of certain sensitive information, for example. In this case, the listener 20b collects information from information traffic as it is being communicated. This information is then processed as described above to determine whether particularly sensitive information is being communicated. As a result of the analysis, a blocking signal may be provided to stop the communication The blocking itself could be implemented in variety of ways such as simply emptying the data before completing transmission, crashing (exception triggering) during the initialization of the communication or during the communication, not executing the communication, or by injecting different code. In addition, as noted above, blocking may be done prospectively to prevent future communication from certain sources or to certain receivers. In this case, the analysis may provide a list of exchanges or user accounts whose exchanges are to be blocked in the future and provided to the user of the system to alert the administrator of the business application to block these communications.

Blocking pseudo code
Detecting a data exchange
collecting all context, user and external information
Returning the decision to block (from the controller, based on the classification rules and analysis, or some other information)
Listener replacing the information in the exchange buffer with an empty buffer.
Writing additional log, that a communication between these peers have been blocked.

Figure 10:
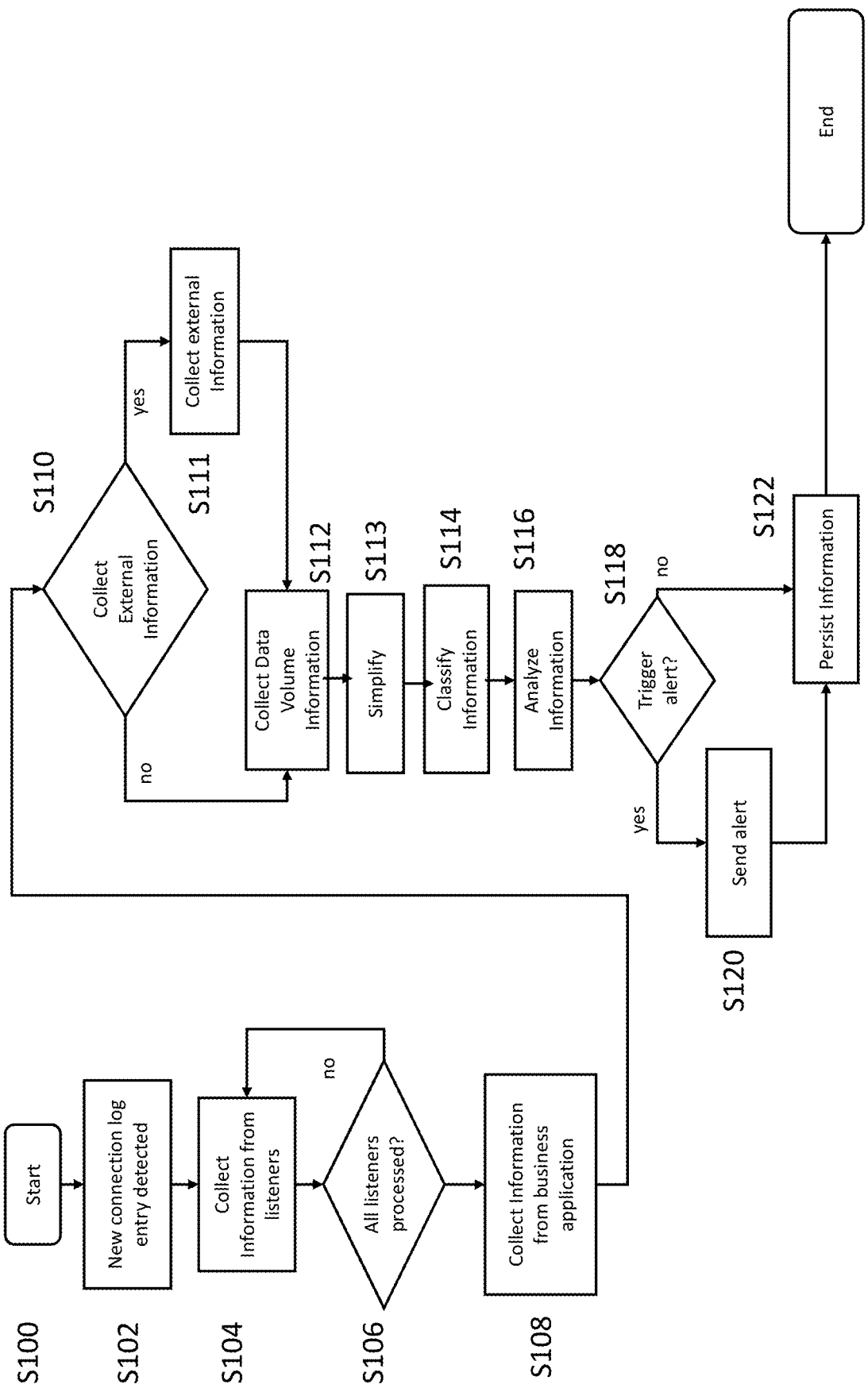
FIG. 10 is a flow chart illustrating an exemplary method of monitoring and securing data communications between a plurality business applications in accordance with an exemplary embodiment of the present disclosure.

FIG. 10 illustrates an exemplary flow chart illustrating the steps of a method for monitoring and securing data communications between a plurality business applications in a network that may be implemented in the system 100. In an embodiment, the method is implemented with respect to a single business application. Additional instances of the method may by implemented with respect to other business applications, systems, databases etc. and report information from each instance may be combined into a universal report or super-unified report. Alternatively, the method may be applied to a variety of business applications. The method of FIG. 10 uses passive listeners 20a, 20b and does not include the optional step of aggregating. The method begins at step S100. At step S102, a log file entry is detected. At step 104, information is collected from the log file, via listener 20a, for example, or other listeners. At step 106, a determination is made as to whether all listeners have provided information. If not, step 104 is repeated. If so, data is collected from the business application, if available as step S108. At step 110, a determination is made as to whether to collect external information, such as information from external lists as described with respect to enriching information. If not, at step S112, data volume information is collected regarding the total volume of the gathered data. Otherwise, at step S111, external information is collected and then the total data volume is determined at step S112. At step S113, the information is simplified, preferably using normalization. It is noted that this simplification step may take place earlier in the method, if desired, to make the optional enriching and aggregating steps easier. At step S114, the simplified and normalized information is classified, for example, based on common features and certain communications may be designated as including sensitive information. At step 116, the collected and classified information is analyzed to provide a report on the communicated data. This analysis may result in the triggering of an alert signal to a user or system administrator. The alert maybe used to notify the user or administrator of suspicious communications of sensitive information or other unusual activity. A determination of whether or not an alert should be issued is made in step S118. If so, the alert is sent at step S120. Otherwise, at step S122, the report data is preferably provided to a user or administrator, or may be provided to another system 100 for combining with information related to other business applications, if desired in step 122. The report data is preferably saved or archived as well. In an embodiment, information may be provided to another system or entity carrying out the same method for further processing at any point after step S112.

Figure 11:
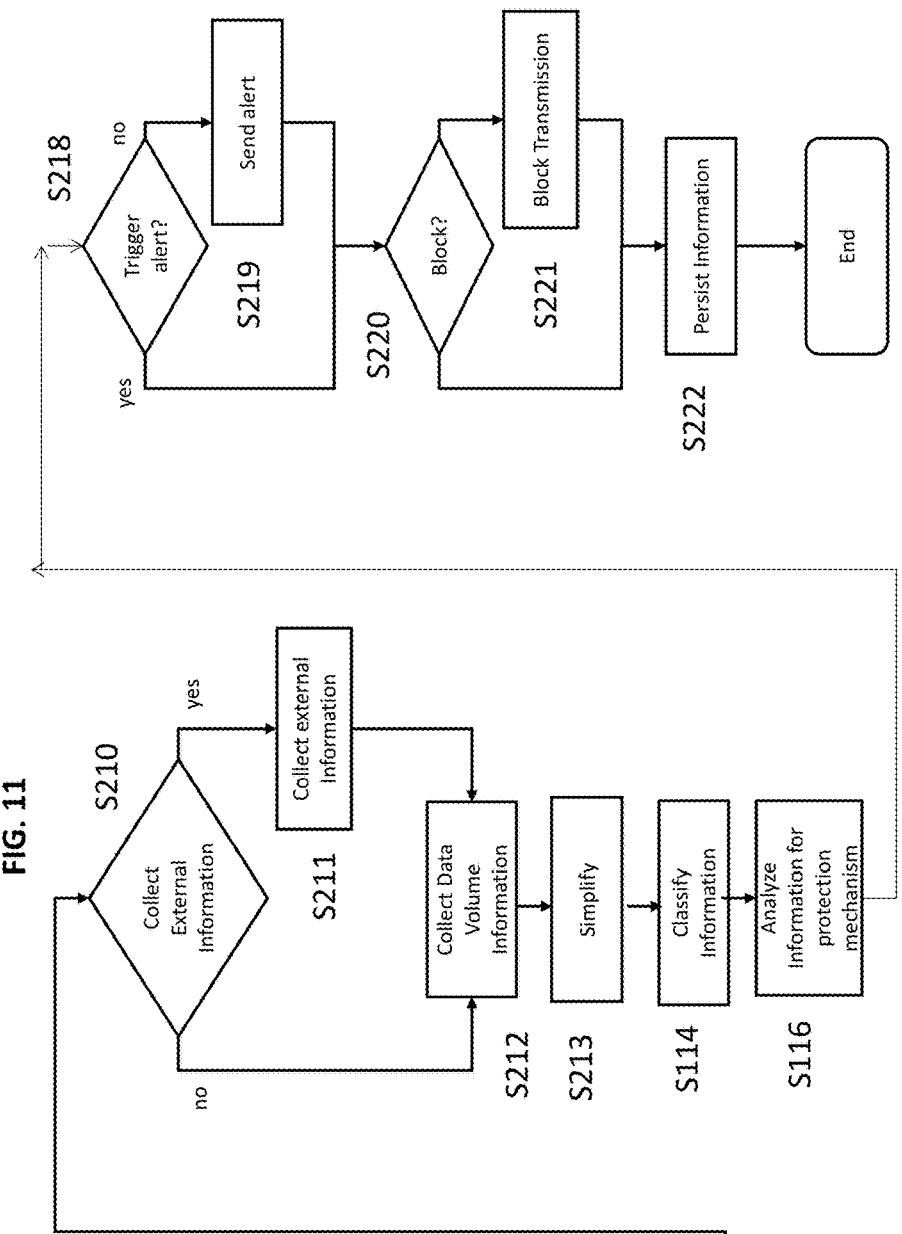
FIG. 11 is a flow chart illustrating another exemplary method of monitoring and securing data communications between a plurality business applications in a network in accordance with an exemplary embodiment of the present disclosure.

FIG. 11 illustrates another exemplary flow chart for a method for monitoring and securing data communications between a plurality business applications in a network that may be implemented in the system 100. This flow chart, however, assumes the use of active listeners to gather information regarding communication. The method begins at step 200 and a new connection event is detected at step S202. That is, a connection between a business application and an external element such as another business application, service, database etc. is detected. At step S204 all information picked up by the listeners is collected. In this case, listener 20b, for example, monitors communications with external elements and gather information regarding these communications. As step 206, a determination is made as to whether all listeners have collected information. If not, step 204 is repeated. Otherwise, at step S208, information is collected from the business application, if available. At step S210, a determination is made as to whether to collect external information. If so, this data enrichment regarding external information is collected at step S211, using listener 20b, for example. At step S212, all data gathered is joined to determine a total volume of the information. At step S213 the gathered data is preferable simplified using a normalization technique to allow for easier future processing. As note above, however, this simplification step may take place earlier in the method. At step S214, the gathered information is classified as noted above in step S114. The classified and collected data is then analyzed in step S216. As part of this analysis, a determination is made as to whether an alert should be provided with respect to communication of particularly sensitive information or based on suspicious activity observed regarding particular users etc. at step S218. If so, an alert if sent at S219. A determination regarding whether communication should be blocked is made at step S220. If so, a block signal or command it generate and provided to block communication at step S221. As is discussed above, blocking may take the form of blocking a currently unfolding communication or blocking future communications from or to a particular user or particular source. In any case, at step S222, the information provided in the analysis is presented to a user or administrator as a report or sent to another location for combination with report information related to another business application, system or database. In a system covering more than one business application and in the event that blocking is a desired response to the analysis, the steps S214, S218, S219, S220 and S222 may be implemented on another system or application implementing the same method, however, the execution of the results should take place on the system executing these steps.

FIG. 12 illustrates an exemplary flow chart of a method of gathering information regarding communications between business applications. The method of claim 12 is preferably carried out by the listeners 20a, 20b discussed above and may be carried out by other listeners as well. The method starts at step S300. At step S302, the listeners or other gathering agents collect user information regarding communications. At step S304, context information regarding the communications is gathered. At step S306 system information related to the communications is gathered. Destination information is gathered at step S308. All of this information may be collected by the listeners 20a or other agents from log files maintained in the business application or by the business application or by listeners monitoring communication traffic. At step S310, a determination is made as to whether or not to collect external information, If so, this information is collected at step S312, using the listener 20b or the data enriching, for example. At step 314 all gathered information is combined and a determination of the total volume of the information is made.

Figure 13:
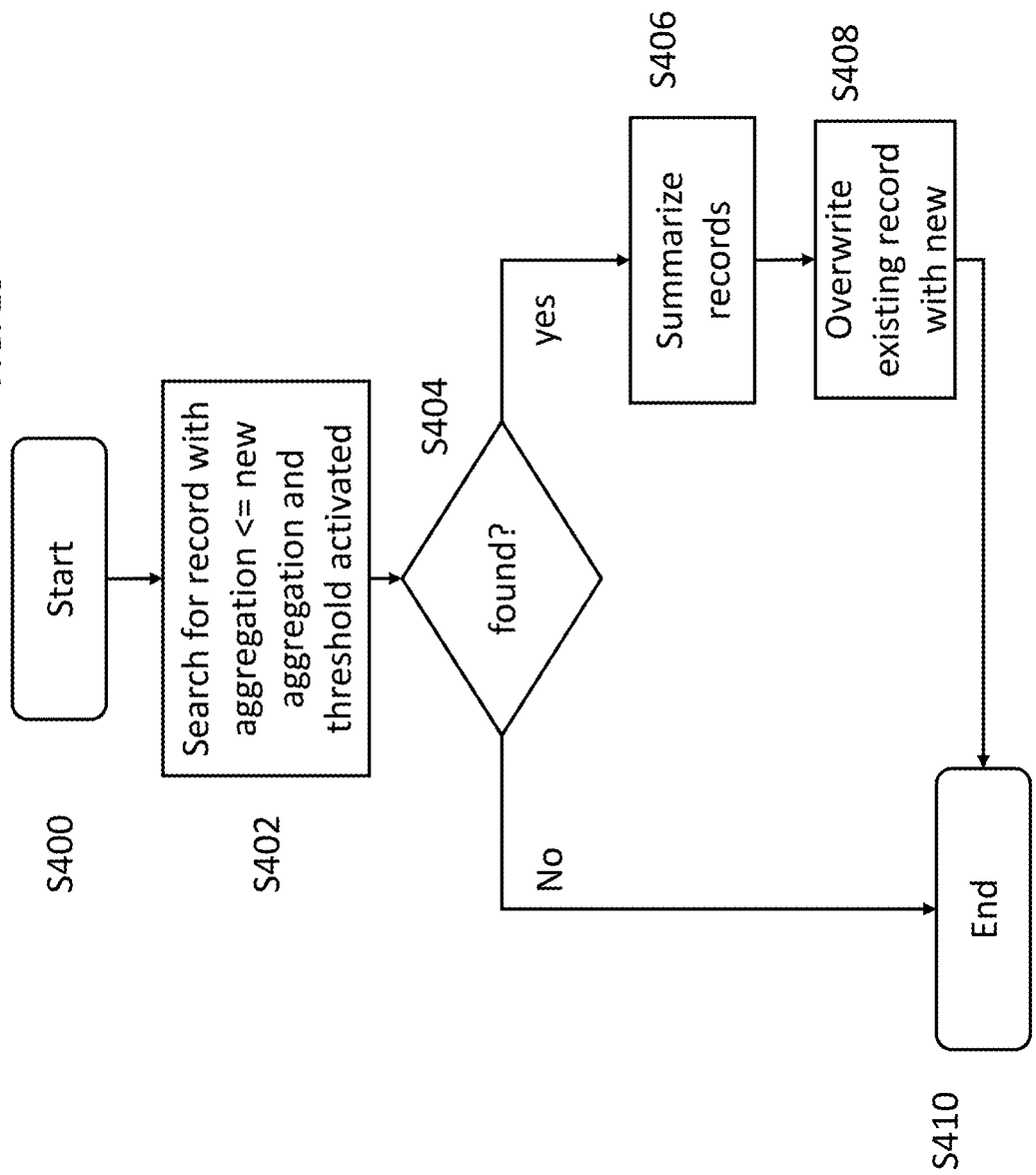
FIG. 13 is a flow chart illustrating an exemplary method of aggregating the information gathered in the method of FIG. 12 in accordance with an exemplary embodiment of the present disclosure.

FIG. 13 illustrates an exemplary flow chart of a method of aggregating the gathered information suitable for use by the aggregator 16, for example. As noted above, the aggregator 16 is an optional element of the system 100. The aggregation method starts at step S400. At step 402, records are compared to determine if there is redundant information and whether they relate to communication within a given threshold time frame. At step S404, a determination is made whether there is a record that meets the criteria of step S402. If so, the records are combined at step S406 and the new combined record is overwritten over the original records at step S408. Otherwise, no aggregation occurs.

Figure 14:
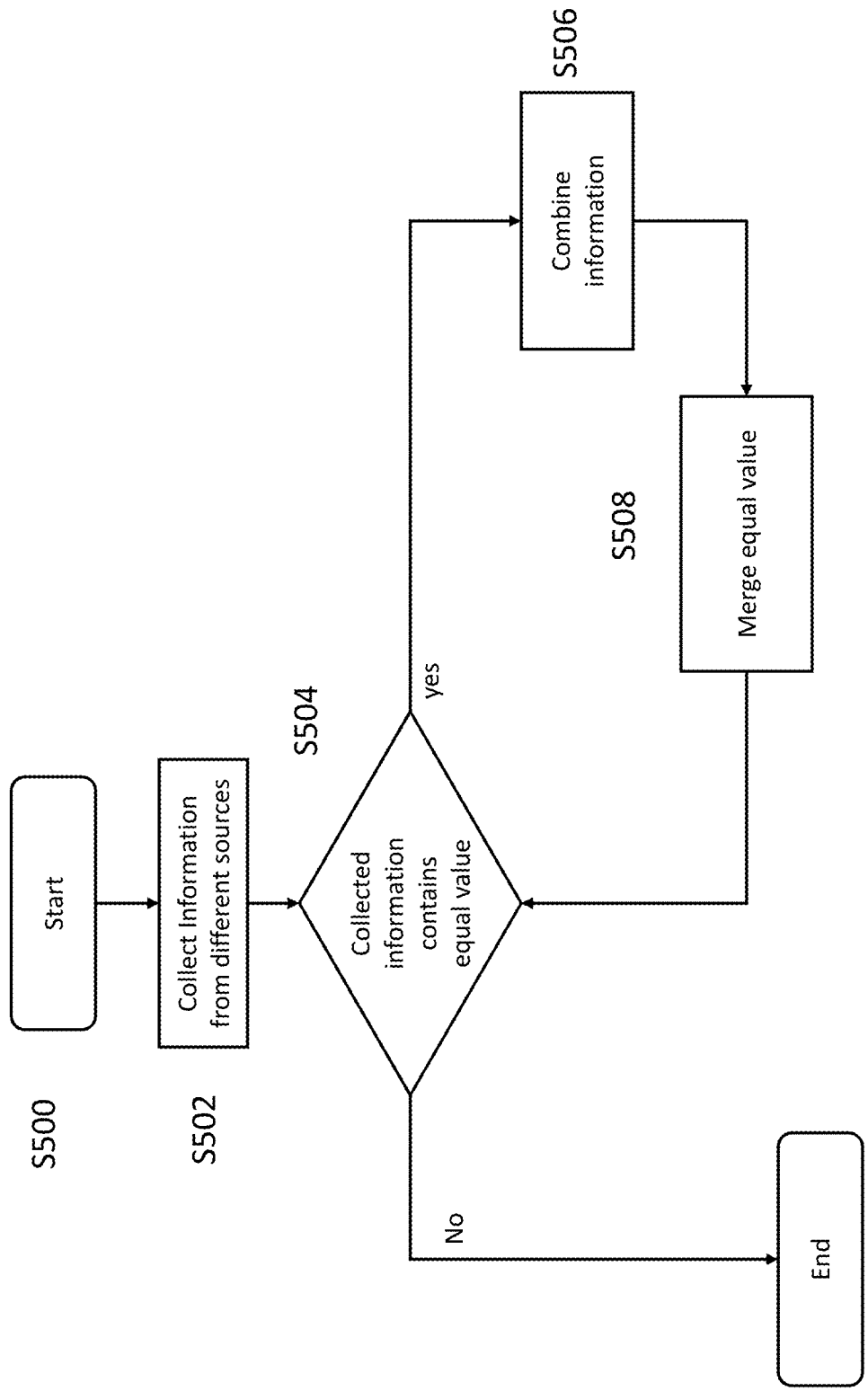
FIG. 14 is a flow chart illustrating an exemplary method of simplifying the gathered data in accordance with an exemplary embodiment of the present disclosure.

FIG. 14 illustrates an exemplary flow chart illustrating an exemplary method of simplifying the information gathered. The method begins at step S500. At step S502 the collected information is accessed. At step S504, a determination is made as to whether the information, or a record is of equal value or reliability as another. If so, at step S506, the information or records are combined and a merged record is provided at step S508. If not, no merge is provided. If desired, any standard normalization technique may be used to simplify the information.

FIG. 15 illustrates an exemplary method of classifying the gathered information. The method starts at step S600. At step S602 a search is made for records with the same key. Records with the same key have the same value with respect to a specific parameter, for example, user identity, sender identity, receiver identity, etc. At step S604 is decision is made as to whether any such records are found. If a record does not have the same key as any other record, at step S608 a new classification of key fields is created and this record is stored in the new classification at step S610. Otherwise the record is classified with an existing key classification to which it matches at step 606.

Step 16 illustrates an exemplary method of analyzing the classified data. The method begins at step S700. At step S702, a user or administrator query is provided with respect to a parameter of the information, such as user information, sender identification, receiver identification, etc. At step S704, information is read based on the inquiry. At step S706, a determination is made as to whether any data matching the inquiry was read. If so, at step S708, this data is preferably displayed to the user or administrator. At step S709, a determination is made as to whether the user adjusted their selection. If so, the method returns to step S708 and new data is displayed. If the determination at step S706 is no, there is no need to display data, although, a display may be provided to show no data was found.

Figure 17:
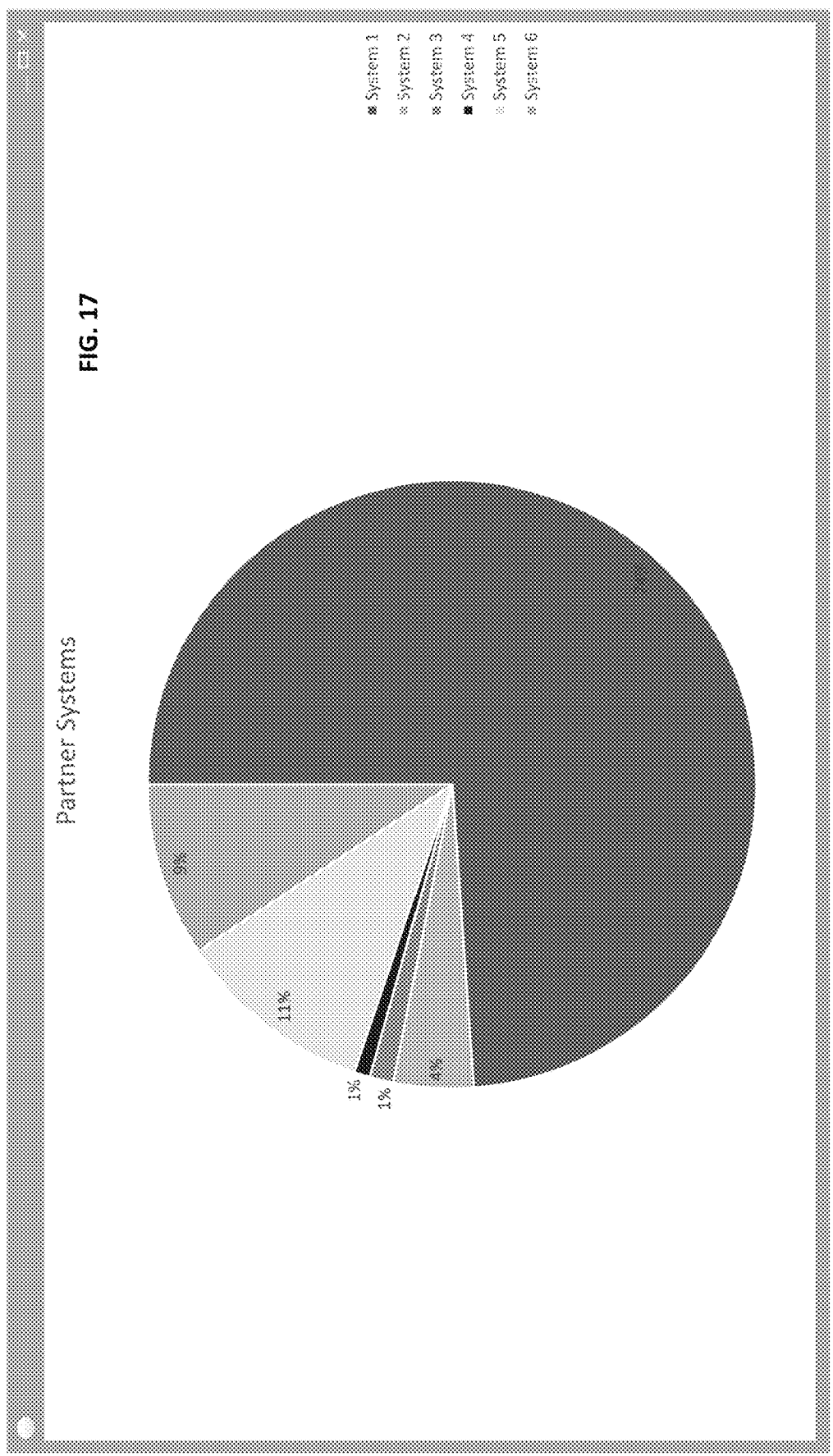
FIG. 17 is an exemplary graphical illustration of a report relating to the data presented to a user on a user interface in accordance with an exemplary embodiment of the present disclosure.
Figure 18:
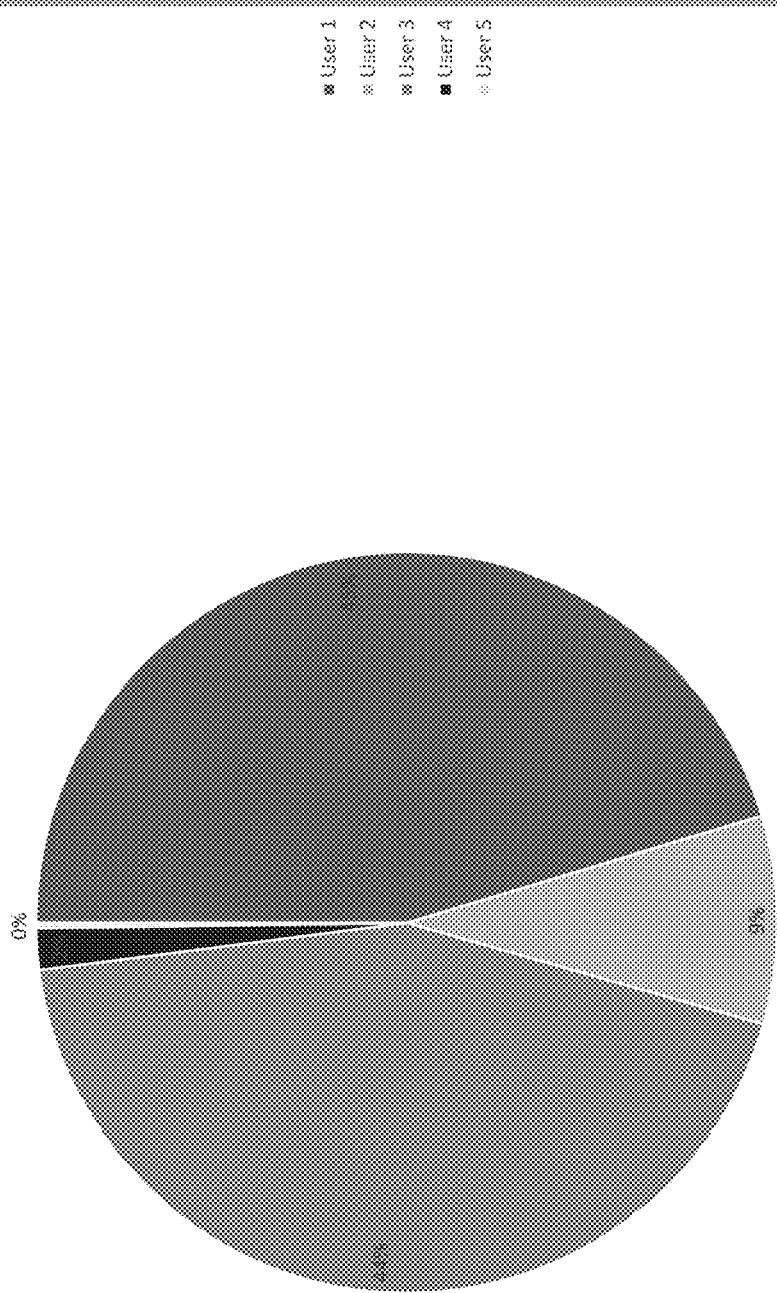
FIG. 18 is another exemplary graphical illustration of a report relating to the data presented to a user on a user interface in accordance with an exemplary embodiment of the present disclosure.
Figure 19:
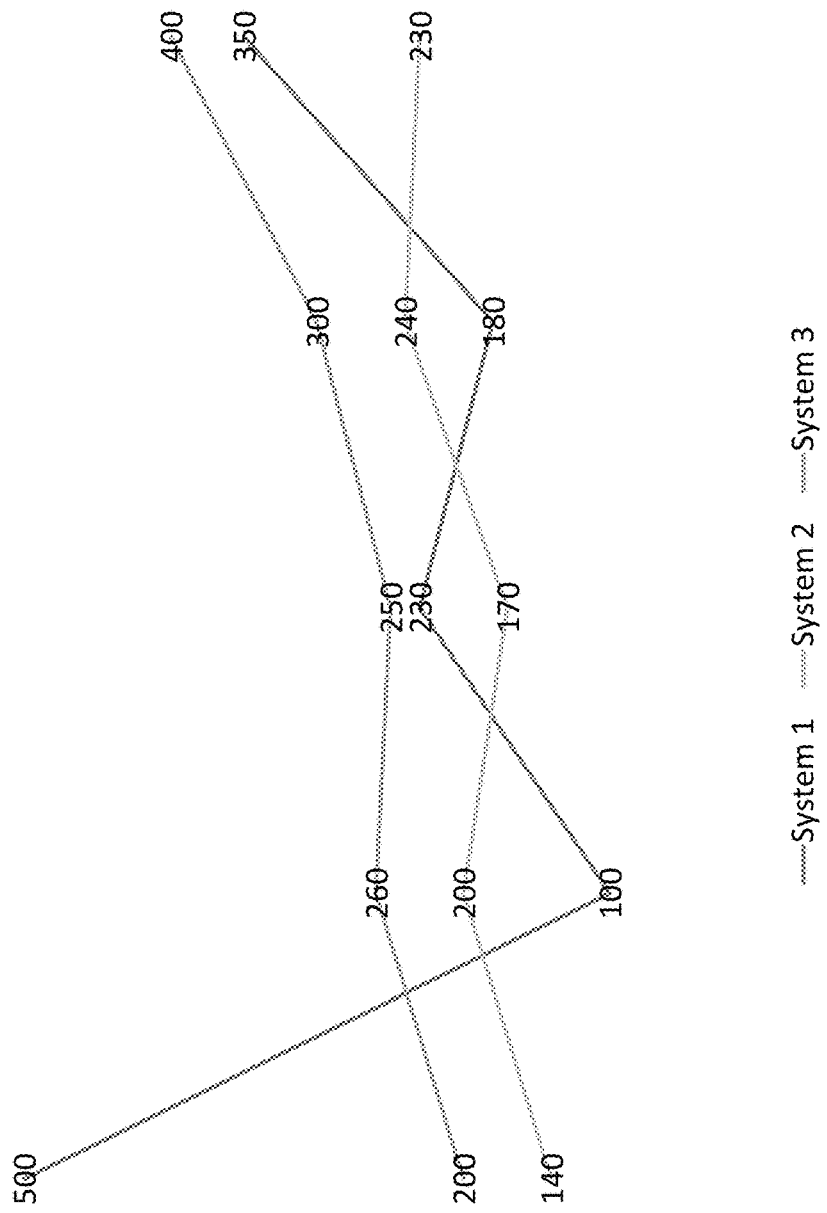
FIG. 19 is another exemplary graphical illustration of a report relating to the data presented to a user on a user interface in accordance with an exemplary embodiment of the present disclosure.

FIGS. 17, 18 and 19 illustrate exemplary screen shots of reports that may be displayed to a user or administrator based on the analysis step discussed above. As noted above, the information displayed is based on user entered queries or preferences. It is noted that this information may be available for a single business applications or in a combined form related to a plurality of business applications implementing multiple instances of the system 100, which preferably implements one or more of the methods described above.

Although the present invention has been described in relation to particular embodiments thereof, many other variations and modifications and other uses will become apparent to those skilled in the art. Steps and units described in relation to one aspect of the method or system may be added, or substituted, for steps or units described with respect to another aspect of the system. Combinations and permutations of steps different from those outlined are also contemplated. Steps outlined in sequence need not necessarily be performed in sequence, not all steps need necessarily be executed, and other intervening steps may be inserted. It is preferred, therefore, that the present invention be limited not by the specific disclosure herein.

What is claimed is:

1. A method for monitoring and securing data communications between a plurality of business applications in a network comprises steps of:
   a) gathering, using a computing device, information regarding communications between the plurality of business applications,
   the gathering step further including steps of:
      1) reading information from a log file in which information regarding each communication into and out of a respective business application is recorded;
      2) reading information from internal files of the respective business application; and
      3) recording information obtained from data messages entering and leaving the respective business application;
   b) enhancing the gathered information based on an environment of the information to add information,
   the enhancing step further including steps of:
      1) adding information to the gathered information based on an [IP] Internet Protocol (IP) address included in the gathered information; and
      2) adding information to the gathered information based on external information;
   c) aggregating the enhanced data to minimize a size of the information, the aggregating step further including steps of:
      1) comparing information regarding communication at a first time with information regarding a communication at a second time; and
      2) aggregating the information regarding communication at the first time with the information regarding the communication at the second time when information is redundant and the second time is within a predetermined time interval of the first time;
   d) simplifying the gathered information,
   the simplifying step further including steps of:
      1) normalizing the information into a common format based on a shared parameter value; and
      2) merging the normalized information together;

e) classifying the information based on desired parameters, the classifying step further including steps of:
  1) designating a classification of the information based on content of the communication; and
  2) designating certain information as sensitive; and f) analyzing the classified information to provide a report on the information to be presented to a user via a user interface based on a user provided query, the analyzing step further including a step of generating the report based at least in part on the classification of the information designated in the classifying step.

2. A method for monitoring and securing data communications between a plurality business applications in a network comprises steps of:

a) gathering, using a computing device, information regarding communications between the plurality of business applications, the gathering step further including steps of:
  1) reading information from a log file in which information regarding each communication into and out of a business application is recorded;
  2) reading information from internal files of the business application; and
  3) recording information obtained from data messages entering and leaving the business application;

b) simplifying the gathered information, the simplifying step further including steps of:
  1) normalizing the information into a common format based on a shared parameter value; and
  2) merging the normalized information together;

c) classifying the information based on desired parameters, the classifying step further including steps of:
  1) designating a classification of the information based on content of the communication; and
  2) designating certain information as sensitive; and d) analyzing the classified information to provide a report on the information to be presented to a user via a user interface based on a user provided query, the analyzing step further including a step of generating the report based at least in part on the classification of the information designated in the classifying step;

e) enhancing the gathered information based on an environment of the information to add information, the enhancing step further including steps of:
  1) adding information to the gathered information based on an [IP] Internet Protocol (IP) address included in the gathered information; and
  2) adding information to the gathered information based on external information; and f) aggregating the enhanced data, prior to the simplification step, to minimize a size of the information, the aggregating step further including steps of:
  1) comparing information regarding communication at a first time with information regarding a communication at a second time; and
  2) aggregating the information regarding communication at the first time with the information regarding the communication at the second time when information is redundant and the second time is within a predetermined time interval of the first time.

3. The method of claim 2, wherein the step of adding information in the enhancing step further comprises adding geographical information based on the [IP] Internet Protocol (IP) address included in the gathered information.

4. The method of claim 2, wherein the gathering step is triggered by a change in the activity log of the business application.

5. The method of claim 2, wherein the gathering step is implemented periodically based on passage of a predetermined period of time.

6. The method of claim 2, wherein classification of the information is based on an identification of the sender of the data communicated.

7. The method of claim 2, wherein classification of the information is based on identification of a source of the data communicated.

8. The method of claim 2, wherein the analyzing step includes determining the identification of the sender that sends the most data and including this identification in the report.

9. The method of claim 2, wherein the analyzing step includes determining the identification of a receiver that received the most data and including this identification in the report.

10. The method of claim 2, wherein the analyzing step includes generating an alert message when a determination is made that sensitive information is communicated in a suspicious manner.

11. The method of claim 2, wherein the analyzing step includes generating an alert when a determination is made that data from a sensitive source is being communicated.

12. The method of claim 2, wherein the analyzing step include generating a blocking command to block communication of certain information.

13. A method for monitoring and securing data communications between a plurality of business applications in a network comprises steps of:

a) gathering, using a computing device, information regarding communication between the plurality of business applications, the gathering step further including steps of:
  1) reading information from a log file in which information regarding each communication into and out of a business application is recorded;
  2) reading information from internal files of a business application; and
  3) recording information obtained from data messages entering and leaving the business application;

b) simplifying the gathered information, the simplifying step further including steps of:
  1) normalizing the information into a common format based on a shared parameter value; and
  2) merging the normalized information together;

c) classifying the information based on desired parameters, the classifying step further including steps of:
  1) designating a classification of the information based on content of the communication; and
  2) designating certain information as sensitive;

d) analyzing the classified information to provide a report on the information to be presented to a user via a user interface;

the analyzing step further including a step of generating the report based at least in part on the classification of the information designated in the classifying step; and e) sending the report to another business application of the plurality of business applications in the network and combining it with a report of the another business application;

f) enhancing the gathered information, prior to the simplification step, based on an environment of the information to add information,
the enhancing step further including steps of:
1) adding information to the gathered information based on an Internet Protocol (IP) address included in the gathered information; and
2) adding information to the gathered information based on external information;
g) aggregating the enhanced information, prior to the simplification step, to minimize a size of the information,
the aggregating step further including steps of:
1) comparing information regarding a communication at a first time with information regarding a communication at a second time; and
2) aggregating the information regarding communication at the first time with the information regarding the communication at a second time when information is redundant and the second time is within a predetermined time interval of the first time.

14. The method of claim 13, further comprising generating a universal report based on the report and the report of the another business application and providing the universal report to a user.

15. The method of claim 13, further comprising, selecting by the user, display of the universal report.

16. The method of claim 13, further comprising, selecting, by the user, display of the report.

17. The method of claim 13, further comprising, selecting, by the user, display of the report of the another business application.

18. A system for monitoring and securing data communications between a plurality business applications in a network comprises:
at least one listener operable to gather information regarding communication between business applications in a network, the listener gathering the information by at least one of reading information from a log file in which information regarding each communication into and out of a business application is recorded, reading information out of other files, other than the log file, related to the business application and recording information obtained from data messages entering and leaving the business application;
an enriching element operable to enhance the gathered information based on an environment of the data to add information, the enriching element enhancing the information by at least one of adding information to the gathered information based on an [IP] Internet Protocol (IP) address included in the gathered information and adding information to the gathered information based on external information;
an aggregator operable to aggregate the information to minimize a size of the information, the aggregator element aggregating the information by comparing information regarding communication at a first time with information regarding a communication at a second time and aggregating the information regarding the communication at the first time with the information regarding the communication at a second time when information is redundant and the second time is within a predetermined timer interval of the first time;
a simplification element simplifying the gathered information, the simplification element normalizing the information into a common format based on a shared parameter value and merging the normalized information together;
a classification element operable to classify the simplified information based on desired parameters, the classification element classifying the information by designating a classification of the information based on content of the communication and designating certain information as sensitive;
an analysis element operable to analyze the information to provide a report on the information to be presented to a user, where the analysis element generates the report based at least in part on the classification of the information designated in the classifying step; and
a user interface operable to display the report to a user.

19. A system for monitoring and securing data communications between a plurality business applications in a network comprises:
at least one listener operable to gather information regarding communication between business applications in a network, the listener gathering the information by at least one of reading information from a log file in which information regarding each communication into and out of a business application is recorded, reading information out of other files, other than the log file related to the business application and recording information obtained from data messages entering and leaving the business application;
a simplification element simplifying the gathered information, the simplification element normalizing the information into a common format based on a shared parameter value and merging the normalized information together;
a classification element operable to classify the simplified information based on desired parameters, the classification element classifying the information by designating a classification of the information based on content of the communication and designating certain information as sensitive;
an analysis element operable to analyze the information to provide a report on the information to be presented to a user, where the analysis element generates the report based at least in part on the classification of the information designated in the classifying step;
a user interface operable to display the report to a user;
an enriching element operable to enhance the gathered information based on an environment of the data to add information, the enriching element enhancing the information by at least one of adding information to the gathered information based on an [IP] Internet Protocol (IP) address included in the gathered information and adding information to the gathered information based on external information; and
an aggregator operable to aggregate the information to minimize a size of the information, the aggregator element aggregating the information by comparing information regarding communication at a first time with information regarding a communication at a second time and aggregating the information regarding communication at the first time with the information regarding the communication at a second time when information is redundant and the second time is within a predetermined time interval of the first time.

20. A system for monitoring and securing data communications between a plurality business applications in a network comprises:

at least one listening element operable to gather information regarding communication between business applications in a network, the listening element gathering the information by at least one of reading information from a log file in which information regarding each communication into and out of a business application is recorded, reading information out of other files, other than the log file, related to the business application and recording information obtained from data messages entering and leaving the business application;

an enriching element operable to enhance the gathered information based on an environment of the data to add information, the enriching element enhancing the information by at least one of adding information to the gathered information based on an [IP] Internet Protocol (IP) address included in the gathered information; and adding information to the gathered information based on external information;

an aggregator operable to aggregate the information to minimize a size of the information, the aggregating element aggregates by comparing information regarding communication at a first time with information regarding a communication at a second time and aggregating the information regarding communication at the first time with information regarding the communication at a second time when information is redundant and the second time is within a predetermined time interval of the first time;

a simplification element simplifying the gathered information, the simplification element normalizing the information into a common format based on a shared parameter value and merging the normalized information together;

a classification element operable to classify the information based on desired parameters, the classification element classifying the information by at least one of designating a classification of the information based on content of the communication and designating certain information as sensitive;

an analysis element operable to analyze the classified information to provide a report on the information to be presented to a user, where the analysis element generates the report based at least in part on the classification of the information designated in the classifying step; and a user interface associated with a second business application and operable to display at least one of one of the report, a second report related to a second business application and a combined report including the report and the second report to a user.

21. A system for monitoring and securing data communications between a plurality business applications in a network comprises:

at least one listening element operable to gather information regarding communication between business applications in a network, the listening element gathering the information by at least one of reading information from a log file in which information regarding each communication into and out of a business application is recorded, reading information out of other files, other than the log file, related to the business application and recording information obtained from data messages entering and leaving the business application;

a simplification element simplifying the gathered information, the simplification element normalizing the information into a common format based on a shared parameter value and merging the normalized information together;

a classification element operable to classify the information based on desired parameters, the classification element classifying the information by at least one of designating a classification of the information based on content of the communication and designating certain information as sensitive;

an analysis element operable to analyze the classified information to provide a report on the information to be presented to a user, where the analysis element generates the report based at least in part on the classification of the information designated in the classifying step; and a user interface associated with a second business application and operable to display at least one of one of the report, a second report related to the second business application and a combination of the report and second report to a user;

an enriching element operable to enhance the gathered information based on an environment of the data to add information, the enriching element enhancing the information by at least one of adding information to the gathered information based on an Internet Protocol (IP) address included in the gathered information and adding information to the gathered information based on static features of the business application;

an aggregator operable to aggregate the information to minimize a size of the information, the aggregating element aggregates by comparing information regarding communication at a first time with information regarding a communication at a second time and aggregating the information regarding communication at the first time with information regarding the communication at a second time when information is redundant and the second time is within a predetermined timer interval of the first time.

22. The system of claim 21, further comprising a second analysis element associated with the second business application and configured to receive the report and combine it with the second report to provide a combined report that is displayed to the user on the user interface.

* * * * *